US012776111B2

(12) United States Patent
Stolzenberg et al.

(10) Patent No.: US 12,776,111 B2
(45) Date of Patent: Oct. 27, 2026

(54) THREE-DIMENSIONAL CHAT THREAD VISUALIZATION AND INTERACTION IN AUGMENTED REALITY

(71) Applicant: Snap Inc., Santa Monica, CA (US)

(72) Inventors: Karen Stolzenberg, Venice, CA (US); Mitchell Kuppersmith, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 102 days.

(21) Appl. No.: 18/816,943

(22) Filed: Aug. 27, 2024

(65) Prior Publication Data

US 2026/0065600 A1 Mar. 5, 2026

(51) Int. Cl.
*G06T 19/00* (2011.01)
*G06T 19/20* (2011.01)
*H04L 51/04* (2022.01)
*H04L 51/214* (2022.01)

(52) U.S. Cl.
CPC ............ *G06T 19/006* (2013.01); *G06T 19/20* (2013.01); *H04L 51/04* (2013.01); *H04L 51/214* (2022.05); *G06T 2219/2004* (2013.01)

(58) Field of Classification Search
CPC .......... G06T 19/006; G06T 19/20; G06N 3/02
See application file for complete search history.

(56) References Cited

U.S. PATENT DOCUMENTS

2012/0086711 A1* 4/2012 Lee ...................... H04N 13/183 345/419
2016/0267094 A1* 9/2016 Darnell ................. G06F 16/958
2019/0107991 A1 4/2019 Spivack et al.
2022/0084295 A1 3/2022 Smith et al.
2023/0198995 A1 6/2023 Agrawal et al.
2024/0303421 A1* 9/2024 Fabian .................... G06F 40/40

OTHER PUBLICATIONS

"International Application Serial No. PCT/US2025/041100, International Search Report mailed Nov. 21, 2025", 4 pgs.
"International Application Serial No. PCT/US2025/041100, Written Opinion mailed Nov. 21, 2025", 9 pgs.

* cited by examiner

*Primary Examiner* — Antonio A Caschera
(74) *Attorney, Agent, or Firm* — Schwegman Lundberg & Woessner, P.A.

(57) ABSTRACT

A system and method for contextual three-dimensional messaging in augmented reality (AR) environments receives chat messages with specified real-world destinations and stores them associated with those locations. When a user wearing an AR device enters a destination location, the system detects their presence using techniques like GPS, Wi-Fi positioning, or computer vision. It then generates a 3D visual representation of the message and determines an appropriate spatial position within the physical environment based on environmental analysis and object detection. The 3D message is displayed at the determined position in the AR view. The system can analyze message content to identify topics and match them to detected real-world objects for contextual placement. Users can interact with displayed messages through gestures or voice commands to reply, forward, delete, or reposition messages. This enables immersive, location-aware messaging experiences that seamlessly blend digital content with the physical world.

18 Claims, 14 Drawing Sheets

THREE-DIMENSIONAL CHAT THREAD VISUALIZATION AND INTERACTION IN AUGMENTED REALITY

TECHNICAL FIELD

The present disclosure relates generally to messaging applications and user interfaces for augmented reality (AR) devices. More specifically, the disclosure relates to systems and methods for displaying and interacting with a spatial friend feed, message threads and messages in three-dimensional (3D) space using AR and spatial computing technologies.

BACKGROUND

Spatial computing represents a paradigm shift in how we interact with digital information, moving beyond traditional two-dimensional interfaces to create immersive experiences that blend seamlessly with our physical environment. This emerging field encompasses Augmented Reality ("AR"), Mixed Reality ("MR"), and Extended Reality ("XR") technologies, which integrate computer-generated content with the real world. AR overlays digital information onto the user's view of the physical environment, while MR allows digital objects to interact with the real world in real-time. XR, an umbrella term, includes both AR and MR, as well as fully immersive Virtual Reality ("VR") experiences.

These technologies leverage advanced sensors, cameras, and displays to track the user's environment and create convincing spatial illusions. Users can interact with digital content in natural and intuitive ways, such as using hand gestures to manipulate virtual objects or exploring 3D visualizations. Recent advancements have led to the development of head-mounted displays, smart glasses, and other wearable devices capable of delivering AR/MR/XR experiences. These devices incorporate sophisticated hardware to seamlessly blend digital content with the real world.

The input and output mechanisms of spatial computing devices differ significantly from traditional computing devices. Instead of relying solely on touchscreens or keyboards, they often utilize gesture recognition, voice commands, eye tracking, and spatial awareness for user interactions. Output is no longer confined to a two-dimensional screen but can be projected into the three-dimensional space around the user. As a result, conventional applications and user interfaces do not easily translate to spatial computing devices, often resulting in suboptimal user experiences that fail to take advantage of their unique capabilities.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
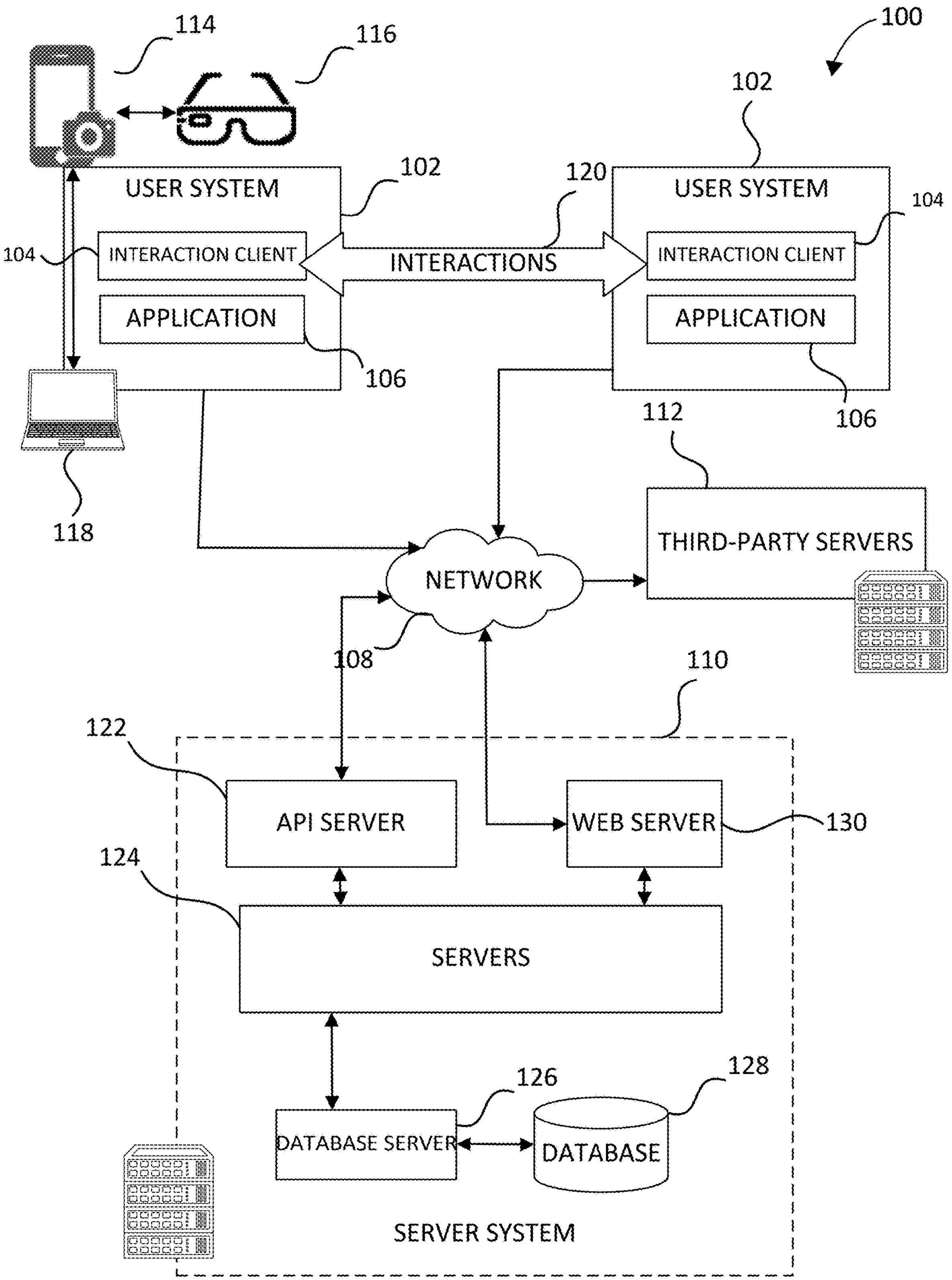
FIG. 1 is a diagrammatic representation of a networked environment in which the present disclosure may be deployed, according to some examples.

The present disclosure describes systems and methods for leveraging spatial computing technologies to enhance messaging and social interactions, particularly for augmented reality ("AR") devices. The described techniques utilize the unique capabilities of AR and spatial computing to create more intuitive, immersive, and context-aware user experiences for messaging and social applications. By employing three-dimensional space, real-world context, and advanced input/output mechanisms of AR devices, the disclosed systems and methods enable users to interact with their social connections and messages in ways that transcend traditional two-dimensional interfaces. The following detailed description provides various embodiments of these systems and methods, including spatial friend feeds, three-dimensional chat interfaces, and context-aware message placement in real-world environments.

Current messaging and social applications face significant technical challenges when adapted for spatial computing environments. Traditional two-dimensional interfaces fail to leverage the full potential of AR devices, resulting in suboptimal user experiences. The technical problem lies in effectively representing and interacting with digital content, such as text messages, images, and social connections, in three-dimensional space while maintaining usability and readability. Moreover, existing systems lack the capability to seamlessly integrate digital communications with the user's physical environment, limiting the contextual relevance and immersive nature of interactions.

Additionally, AR devices introduce unique technical constraints, such as unlimited display real estate, potential visual clutter, and the need for new input modalities. These constraints further complicate the design and implementation of effective messaging and social applications in spatial computing environments. A significant challenge lies in the positioning of content, as it can be tied to the physical world. Misplaced content may obstruct the user's view of the real world in ways that are annoying or potentially hazardous, compromising both user experience and safety. The technical challenge extends to developing efficient algorithms for real-time spatial mapping, object recognition, and content placement that can operate within the computational limitations of wearable AR devices while ensuring optimal and non-intrusive positioning of digital elements in the user's field of view.

To address these technical challenges, the present disclosure proposes novel systems and methods that leverage the advanced capabilities of spatial computing devices. These approaches utilize computer vision algorithms, natural language processing, and spatial awareness technologies to create immersive, three-dimensional user interfaces for messaging and social interactions. By reimagining how users interact with digital content and social connections in spatial computing environments, the proposed solutions offer several technical advantages.

One key advantage is the ability to anchor digital content, such as chat threads or visual representations of friends or social connections, to specific real-world locations or objects. This is achieved through advanced object recognition and spatial mapping techniques, allowing for more intuitive and contextually relevant message placement. For example, a recipe shared in a chat could be automatically anchored to the user's kitchen appliance, enhancing the relevance and accessibility of the information.

Another technical advantage lies in the development of novel visualization techniques for representing social connections and message threads in three-dimensional space. By utilizing depth, scale, and spatial relationships, these methods create more engaging and informative representations of social networks and conversations. This approach not only maximizes the use of available display space in AR environments but also provides users with intuitive visual cues about the nature and importance of their social interactions.

Furthermore, the proposed systems incorporate advanced input recognition algorithms that can interpret gestures, voice commands, and eye movements, enabling more natural and efficient interactions with three-dimensional content. These input methods are complemented by context-aware content delivery systems that can determine the most appropriate time and location to present messages or notifications based on the user's current activity and environment.

By addressing these technical challenges and leveraging the unique capabilities of spatial computing devices, the disclosed systems and methods create messaging and social applications that offer more immersive, context-aware, and emotionally resonant communication experiences. These solutions not only enhance the functionality of AR devices but also pave the way for new forms of digital interaction that are more closely integrated with users' physical realities. These and other advantages will be readily apparent from the detailed description of the several figures that follows.

Networked Computing Environment

FIG. 1 is a block diagram showing an example digital interaction system 100 for facilitating interactions and engagements (e.g., exchanging text messages, conducting text audio and video calls, or playing games) over a network. The digital interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), a server system 110 and third-party servers 112). An interaction client 104 can also communicate with locally hosted applications 106 using Applications Programming Interfaces (APIs). The digital interaction system 100 includes functionality for managing chat threads in an augmented reality (AR) environment, including the ability to associate chat messages with specific real-world destinations and present them to users based on their physical location.

Each user system 102 may include multiple user devices, such as a mobile device 114, head-wearable apparatus 116, and a computer client device 118 that are communicatively connected to exchange data and messages. The head-wearable apparatus 116 includes sensors and cameras capable of capturing environmental data and detecting objects in the user's surroundings, which are used to determine appropriate spatial positions for displaying chat messages in the AR environment.

An interaction client 104 interacts with other interaction clients 104 and with the server system 110 via the network 108. The data exchanged between the interaction clients 104 (e.g., interactions 120) and between the interaction clients 104 and the server system 110 includes functions (e.g., commands to invoke functions) and payload data (e.g., text, audio, video, or other multimedia data). The data exchanged between the interaction clients 104 includes functions and payload data related to chat messages, including message content, specified real-world destinations, and environmental data captured by AR devices.

The server system 110 provides server-side functionality via the network 108 to the interaction clients 104. While certain functions of the digital interaction system 100 are described herein as being performed by either an interaction client 104 or by the server system 110, the location of certain functionality either within the interaction client 104 or the server system 110 may be a design choice. For example, it may be technically preferable to initially deploy particular technology and functionality within the server system 110 but to later migrate this technology and functionality to the interaction client 104 where a user system 102 has sufficient processing capacity.

The server system 110 supports various services and operations that are provided to the interaction clients 104. Such operations include transmitting data to, receiving data from, and processing data generated by the interaction clients 104. This data may include message content, client device information, geolocation information, digital effects (e.g., media augmentation and overlays), message content persistence conditions, entity relationship information, and live event information. Data exchanges within the digital interaction system 100 are invoked and controlled through functions available via user interfaces (UIs) of the interaction clients 104.

Turning now specifically to the server system 110, an Application Programming Interface (API) server 122 is coupled to and provides programmatic interfaces to servers 124, making the functions of the servers 124 accessible to interaction clients 104, other applications 106 and third-party server 112. The servers 124 are communicatively coupled to a database server 126, facilitating access to a database 128 that stores data associated with interactions processed by the servers 124. Similarly, a web server 130 is coupled to the servers 124 and provides web-based interfaces to the servers 124. To this end, the web server 130 processes incoming network requests over the Hypertext Transfer Protocol (HTTP) and several other related protocols. The servers 124 include functionality for analyzing chat message content, determining topics or keywords, and matching them with detected objects in the user's environment to position chat messages appropriately in 3D space.

The Application Programming Interface (API) server 122 receives and transmits interaction data (e.g., commands and message payloads) between the servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the servers 124. The Application Program Interface (API) server 122 exposes various functions supported by the servers 124, including account registration; login functionality; the sending of interaction data, via the servers 124, from a particular interaction client 104 to another interaction client 104; the communication of media files (e.g., images or video) from an interaction client 104 to the servers 124; the settings of a collection of media data (e.g., a narrative); the retrieval of a list of friends of a user of a user system 102; the retrieval of messages and content; the addition and deletion of entities (e.g., friends) to an entity relationship graph (e.g., the entity graph 308); the location of friends within an entity relationship graph; and opening an application event (e.g., relating to the interaction client 104). The API server 122 exposes functions for storing chat messages in association with specified real-world destinations, detecting user presence in specific locations, and generating 3D visual representations of chat messages.

The servers 124 host multiple systems and subsystems, described below with reference to FIG. 2.

External Resources and Linked Applications

The interaction client 104 provides a user interface that allows users to access features and functions of an external resource, such as a linked application 106, an applet, or a microservice. This external resource may be provided by a third party or by the creator of the interaction client 104. The external resource may include advanced computer vision algorithms and generative language models used for analyzing chat message content and determining relevant topics.

The external resource may be a full-scale application installed on the user's system 102, or a smaller, lightweight version of the application, such as an applet or a microservice, hosted either on the user's system or remotely, such as on third-party servers 112 or in the cloud. These smaller versions, which include a subset of the full application's features, may be implemented using a markup-language document and may also incorporate a scripting language and a style sheet.

When a user selects an option to launch or access the external resource, the interaction client 104 determines whether the resource is web-based or a locally installed application. Locally installed applications can be launched independently of the interaction client 104, while applets and microservices can be launched or accessed via the interaction client 104.

If the external resource is a locally installed application, the interaction client 104 instructs the user's system to launch the resource by executing locally stored code. If the resource is web-based, the interaction client 104 communicates with third-party servers to obtain a markup-language document corresponding to the selected resource, which it then processes to present the resource within its user interface.

The interaction client 104 can also notify users of activity in one or more external resources. For instance, it can provide notifications relating to the use of an external resource by one or more members of a user group. Users can be invited to join an active external resource or to launch a recently used but currently inactive resource. The image processing system 202 includes functionality for analyzing images captured by the AR device to detect objects and determine the user's presence in specific real-world locations.

The interaction client 104 can present a list of available external resources to a user, allowing them to launch or access a given resource. This list can be presented in a context-sensitive menu, with icons representing different applications, applets, or microservices varying based on how the menu is launched by the user. The communication system 208 includes functionality for managing chat threads associated with specific real-world locations and presenting chat messages to users based on their physical presence in those locations.

System Architecture

Figure 2:
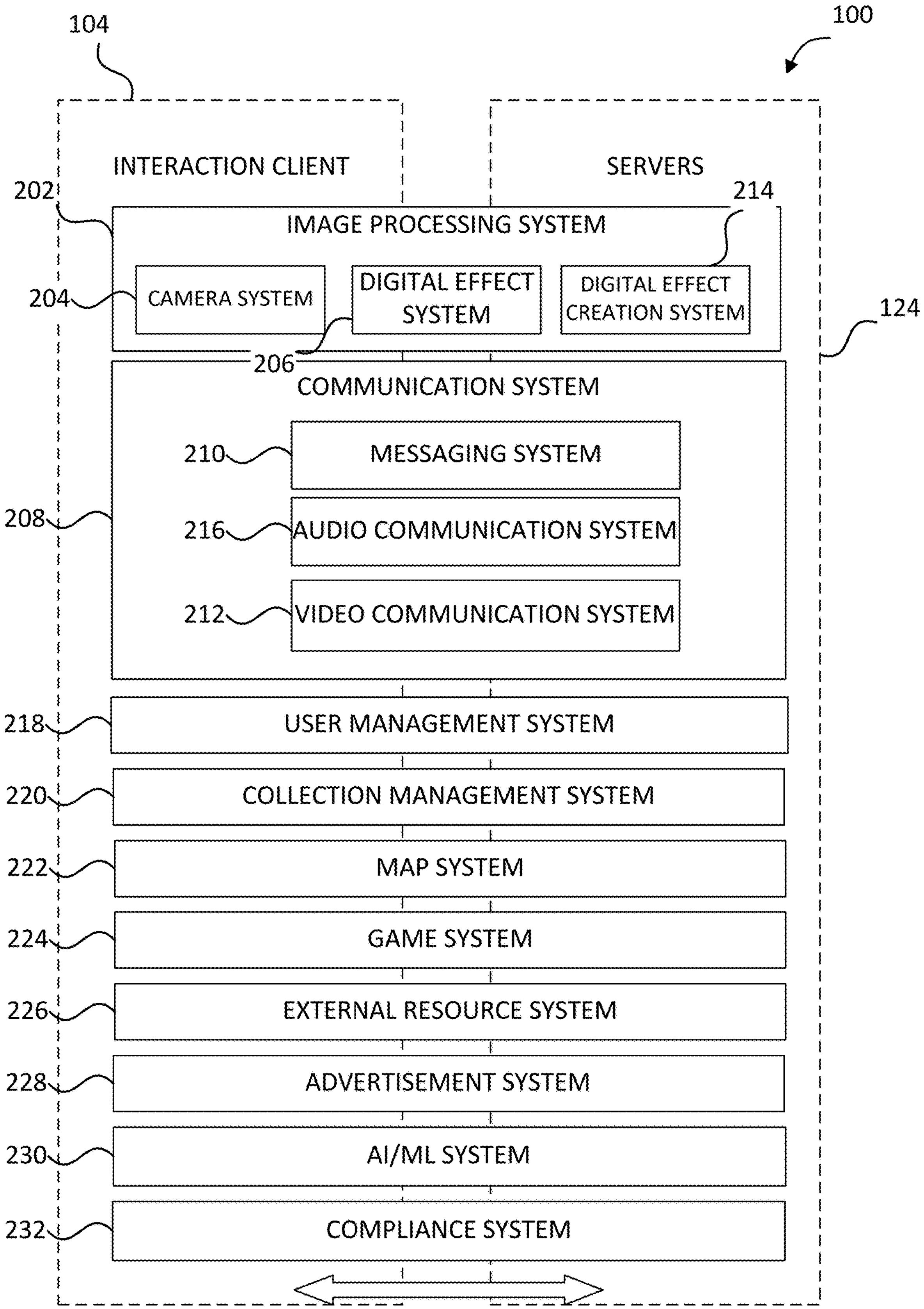
FIG. 2 is a diagrammatic representation of a digital interaction system that has both client-side and server-side functionality, according to some examples.

FIG. 2 is a block diagram illustrating further details regarding the digital interaction system 100, according to some examples. Specifically, the digital interaction system 100 is shown to comprise the interaction client 104 and the servers 124. The digital interaction system 100 embodies multiple subsystems, which are supported on the client-side by the interaction client 104 and on the server-side by the servers 124. In some examples, these subsystems are implemented as microservices. A microservice subsystem (e.g., a microservice application) may have components that enable it to operate independently and communicate with other services. Example components of microservice subsystem may include:

- Function logic: The function logic implements the functionality of the microservice subsystem, representing a specific capability or function that the microservice provides.
- API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the digital interaction system 100.

Service discovery: Microservice subsystems may find and communicate with other microservice subsystems of the digital interaction system 100. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable the tracking of health and performance of a microservice subsystem.

In some examples, the digital interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and modify (e.g., augment, annotate or otherwise edit) media content associated with a message. The image processing system 202 includes functionality for analyzing environmental data captured by the AR device's sensors to determine appropriate spatial positions for displaying 3D visual representations of chat messages in the AR environment.

A camera system 204 includes control software (e.g., in a camera application) that interacts with and controls hardware camera hardware (e.g., directly or via operating system controls) of the user system 102 to modify real-time images captured and displayed via the interaction client 104. The camera system 204 is used to capture images of the user's surroundings, which are then analyzed using computer vision algorithms to detect objects and determine the user's presence in specific real-world locations associated with chat threads.

The digital effect system 206 provides functions related to the generation and publishing of digital effects (e.g., media overlays) for images captured in real-time by cameras of the user system 102 or retrieved from memory of the user system 102. For example, the digital effect system 206 operatively selects, presents, and displays digital effects (e.g., media overlays such as image filters or modifications) to the interaction client 104 for the modification of real-time images received via the camera system 204 or stored images retrieved from memory 502 of a user system 102. These digital effects are selected by the digital effect system 206 and presented to a user of an interaction client 104, based on a number of inputs and data, such as for example:

Geolocation of the user system 102; and

Entity relationship information of the user of the user system 102.

Consistent with some embodiments, the digital effect system 206 is responsible for generating and rendering 3D visual representations of chat messages in the AR environment, taking into account the spatial positioning determined based on environmental data and detected objects.

Digital effects may include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The digital effect creation system 214 supports augmented reality developer platforms and includes an application for content creators (e.g., artists and developers) to create and publish digital effects (e.g., augmented reality experiences) of the interaction client 104. The digital effect creation system 214 provides a library of built-in features and tools to content creators including, for example custom shaders, tracking technology, and templates.

In some examples, the digital effect creation system 214 provides a merchant-based publication platform that enables merchants to select a particular digital effect associated with a geolocation via a bidding process. For example, the digital effect creation system 214 associates a media overlay of the highest bidding merchant with a corresponding geolocation for a predefined amount of time.

A communication system 208 is responsible for enabling and processing multiple forms of communication and interaction within the digital interaction system 100 and includes a messaging system 210, an audio communication system 216, and a video communication system 212. The messaging system 210 is responsible, in some examples, for enforcing the temporary or time-limited access to content by the interaction clients 104. The messaging system 210 incorporates multiple timers that, based on duration and display parameters associated with a message or collection of messages (e.g., a narrative), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104. The communication system 208 manages the association of chat messages and threads with specific real-world destinations, and controls the presentation of messages to users based on their physical location. The messaging system 210 includes functionality for storing chat messages in association with specified real-world destinations, retrieving them when users enter the corresponding physical locations, and managing the temporal attributes of messages within chat threads to enable depth-based positioning in the AR environment. This system also interfaces with the spatial positioning system to determine appropriate 3D placements for chat message representations based on message content, environmental context, and thread chronology.

The messaging system 210 includes additional components not shown in FIG. 2 that are specifically designed for spatial computing devices. These devices generally refer to augmented reality (AR) headsets, smart glasses, and other wearable devices capable of overlaying digital content onto the user's view of the real world.

The additional components of the messaging system provide functionalities specific to the presentation of content in AR or 3D space, such as:

- Spatial Positioning Component: Determines the appropriate 3D position for displaying chat message threads in the AR environment based on factors like message content, environmental context, and thread chronology.
- Real-World Destination Manager: Associates chat messages with specific real-world locations and manages their retrieval when users enter corresponding physical spaces.
- Environmental Context Analyzer: Processes data from the AR device's sensors to understand the user's surroundings and detect relevant objects for message placement.
- Temporal Attribute Manager: Handles the chronological aspects of messages within a thread to enable depth-based positioning in the AR environment.

These components work together to determine the position at which individual messages, or a message thread should be shown in the AR space. For example, they might analyze the content of messages, match them with detected objects in the environment, and position the thread near relevant real-world items or in a spatial arrangement that represents the conversation's flow and timeline.

It's important to note that this functionality, as well as all other functionalities of the messaging system, can be implemented on the client-side (i.e., on the AR device itself), on the server-side, or through a combination of both. The specific implementation may depend on factors such as processing power requirements, need for real-time responsiveness, and data privacy considerations.

A user management system 218 is operationally responsible for the management of user data and profiles, and maintains entity information (e.g., stored in entity tables 306, entity graphs 308 and profile data 302) regarding users and relationships between users of the digital interaction system 100. The user management system 218 tracks user locations and manages the detection of users entering specific physical locations corresponding to chat thread destinations. The user management system 218 also maintains data on social connections between users, including a friends list for each user. For each friend or social connection, the system stores various relationship attributes that characterize the nature and strength of the connection. These attributes may include:

- Communication frequency: A metric representing how often two users interact through the system, such as exchanging messages or sharing content.
- Relationship closeness score: A numerical value indicating the overall strength of the relationship based on factors like interaction history, mutual friends, and shared interests.
- Recency of interaction: A timestamp or relative measure of how recently the users have communicated or engaged with each other's content.

- Shared experiences: A record of joint activities or events attended together within the system.
- Content similarity: A measure of how closely the users'shared content or interests align.
- Physical proximity: Data on how often users are in the same physical locations or geographic areas.

These relationship attributes can be used to determine the positioning of friends within a three-dimensional friend feed presentation. For example, friends with higher communication frequencies or relationship closeness scores may be displayed closer to the user's viewpoint, while those with lower scores may appear further away in the 3D space. Recent interactions could influence the vertical positioning, with more recent contacts appearing higher in the display. The system could also use these attributes to create a "friendship constellation" or "galaxy" visualization, where the most significant relationships are represented as larger or brighter elements in the 3D space.

By leveraging these relationship attributes, the user management system 218 enables a more intuitive and meaningful representation of a user's social network in augmented reality environments, enhancing the overall user experience of the digital interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event collection." Such a collection may be made available for a specified time period, such as the duration of an event to which the content relates. For example, content relating to a music concert may be made available as a "concert collection" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content. The collection management system 220 manages sets of chat messages associated with specific real-world locations, organizing them into spatially-anchored threads that can be accessed and interacted with in the AR environment.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the digital interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the digital interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the digital interaction system 100. The digital interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the servers 124. The SDK includes Application Programming Interfaces (APIs) with functions that can be called or invoked by the web-based application. The servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to servers 124. The servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and handles the delivery and presentation of these advertisements.

An artificial intelligence and machine learning system 230 provides a variety of services to different subsystems within the digital interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the digital effect system 206 to generate modified content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the server system 110. The artificial intelligence and machine learning system 230 may also work with the audio communication system 216 to provide speech recognition and natural language processing capabilities, allowing users to interact with the digital interaction system 100 using voice commands. The artificial intelligence and machine learning system 230 includes generative language models used for analyzing chat message content, determining relevant topics, and matching them with detected objects in the user's environment to position chat messages appropriately in 3D space.

In some examples, the artificial intelligence and machine learning system 230 also interfaces with the external resource system 226 to leverage externally hosted large language models and other generative AI services. This integration enables advanced natural language processing capabilities for analyzing chat messages and determining relevant topics. The AI/ML system 230 includes a prompt processing component that receives incoming chat messages and generates tailored prompts for the external language models. These prompts typically contain the full message content as context, along with specific instructions directing the model to analyze the message and output a predetermined number of potential topics related to the message content. For example, a prompt may instruct the model to "Analyze the following message and suggest 3-5 main topics it relates to." The external language model processes this prompt and returns a list of relevant topics. The AI/ML system 230 then uses these generated topics to inform the spatial positioning of the message or message thread within the augmented reality environment. Messages with similar topics may be clustered together in 3D space, or messages highly relevant to objects detected in the user's real-world environment can be positioned proximally to those objects in the AR rendering. This topic-based positioning enhances the contextual relevance of message placement in the AR space, creating a more intuitive and meaningful visualization of chat threads that leverages both message content and real-world context.

A compliance system 232 facilitates compliance by the digital interaction system 100 with data privacy and other regulations, including for example the California Consumer Privacy Act (CCPA), General Data Protection Regulation (GDPR), and Digital Services Act (DSA). The compliance system 232 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 232 also incorporates opt-in/opt-out management and privacy controls across the digital interaction system 100, empowering users to manage their data preferences. The compliance system 232 is designed to handle sensitive data by obtaining explicit consent, implementing strict access controls and in accordance with applicable laws.

Data Architecture

Figure 3:
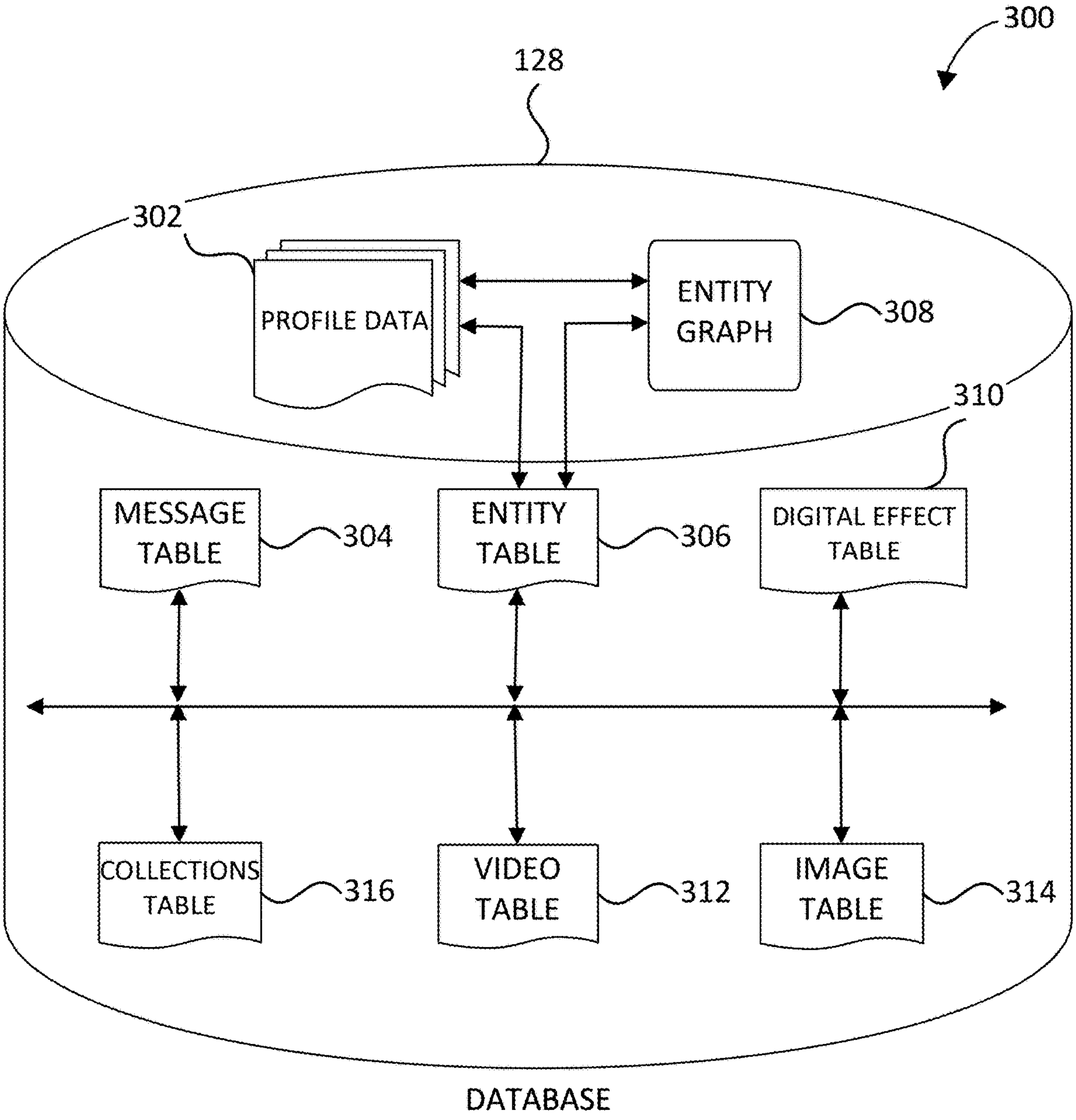
FIG. 3 is a diagrammatic representation of a data structure as maintained in a database, according to some examples.

FIG. 3 is a schematic diagram illustrating data structures 300, which may be stored in the database 128 of the server system 110, according to certain examples. While the content of the database 128 is shown to comprise multiple tables, it will be appreciated that the data could be stored in other types of data structures (e.g., as an object-oriented database).

The database 128 includes message data stored within a message table 304. This message data includes at least message sender data, message recipient (or receiver) data, and a payload. Further details regarding information that may be included in a message, and included within the message data stored in the message table 304, are described below with reference to FIG. 3.

An entity table 306 stores entity data, and is linked (e.g., referentially) to an entity graph 308 and profile data 302. Entities for which records are maintained within the entity table 306 may include individuals, corporate entities, organizations, objects, places, events, and so forth. Regardless of entity type, any entity regarding which the server system 110 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the digital interaction system 100.

Certain permissions and relationships may be attached to each relationship, and to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the digital interaction system 100, or may selectively be applied to certain types of relationships.

The profile data 302 stores multiple types of profile data about a particular entity. The profile data 302 may be selectively used and presented to other users of the digital interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the digital interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 128 also stores digital effect data, such as overlays or filters, in a digital effect table 310. The digital effect data is associated with and applied to videos (for which data is stored in a video table 312) and images (for which data is stored in an image table 314).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other digital effect data that may be stored within the image table 314 includes augmented reality content items (e.g., corresponding to augmented reality experiences). An augmented reality content item may be a real-time special effect and sound that may be added to an image or a video.

A collections table 316 stores data regarding collections of messages and associated image, video, or audio data, which are compiled into a collection (e.g., a narrative or a gallery). The creation of a particular collection may be initiated by a particular user (e.g., each user for which a record is maintained in the entity table 306). A user may create a "personal collection" in the form of a collection of content that has been created and sent/broadcast by that user. To this end, the user interface of the interaction client 104 may include an icon that is user-selectable to enable a sending user to add specific content to his or her personal narrative.

A collection may also constitute a "live collection," which is a collection of content from multiple users that is created manually, automatically, or using a combination of manual and automatic techniques. For example, a "live collection" may constitute a curated stream of user-submitted content from various locations and events. Users whose client devices have location services enabled and are at a common location event at a particular time may, for example, be presented with an option, via a user interface of the interaction client 104, to contribute content to a particular live collection. The live collection may be identified to the user by the interaction client 104, based on his or her location.

A further type of content collection is known as a "location collection," which enables a user whose user system 102 is located within a specific geographic location (e.g., on a college or university campus) to contribute to a particular collection. In some examples, a contribution to a location collection may employ a second degree of authentication to verify that the end-user belongs to a specific organization or other entity (e.g., is a student on the university campus).

As mentioned above, the video table 312 stores video data that, in some examples, is associated with messages for which records are maintained within the message table 304. Similarly, the image table 314 stores image data associated with messages for which message data is stored in the entity table 306. The entity table 306 may associate various digital effects from the digital effect table 310 with various images and videos stored in the image table 314 and the video table 312.

Data Communications Architecture

Figure 4:
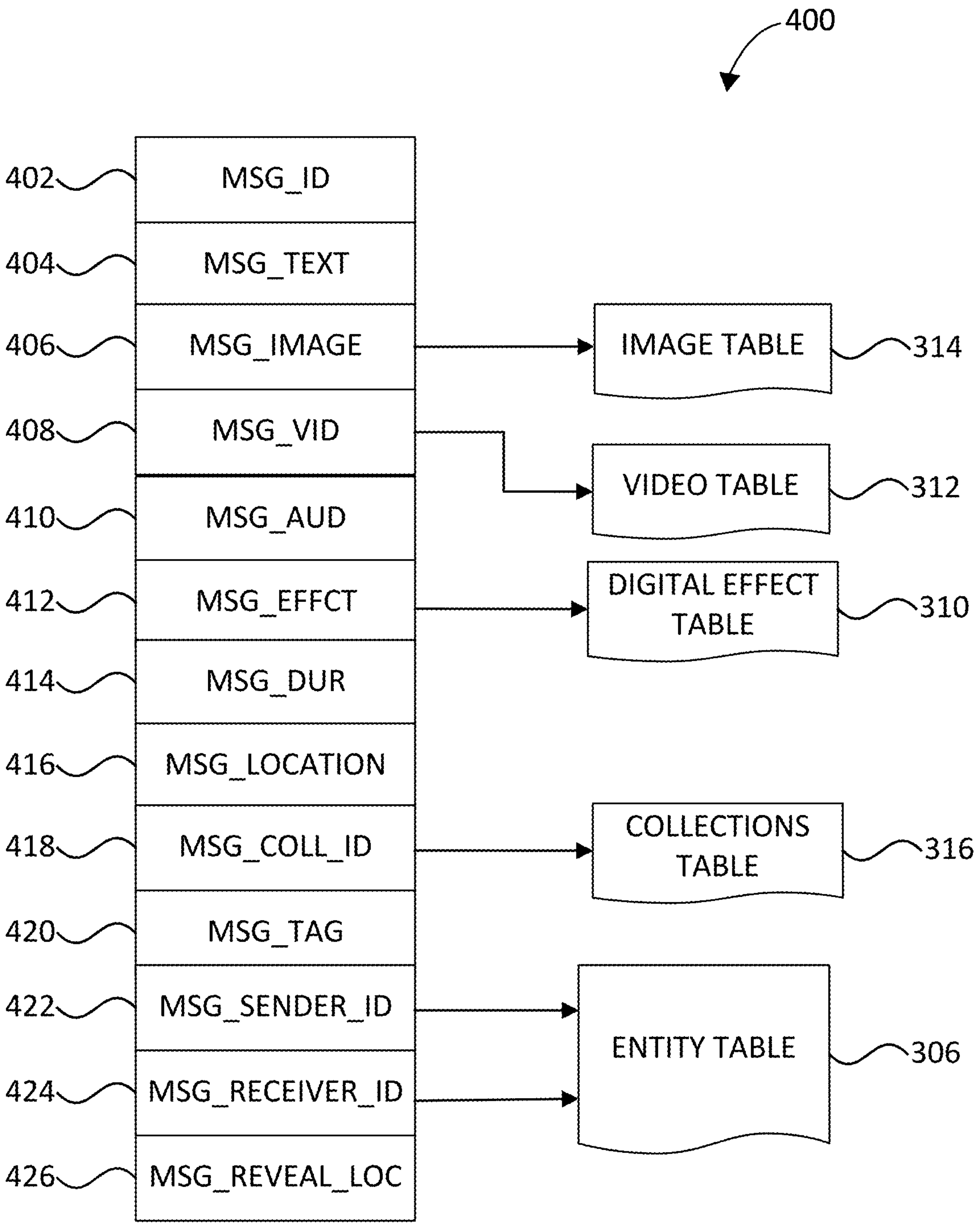
FIG. 4 is a diagrammatic representation of a message, according to some examples.

FIG. 4 is a schematic diagram illustrating a structure of a message 400, according to some examples, generated by an interaction client 104 for communication to a further interaction client via the servers 124. The content of a particular message 400 is used to populate the message table 304 stored within the database 128, accessible by the servers 124. Similarly, the content of a message 400 is stored in memory as "in-transit" or "in-flight" data of the user system 102 or the servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 314.
- Message video payload 408: video data, captured by a camera component or retrieved from a memory component of the user system 102, and that is included in the message 400. Video data for a sent or received message 400 may be stored in the video table 312.
- Message audio payload 410: audio data, captured by a microphone or retrieved from a memory component of the user system 102, and that is included in the message 400.
- Message digital effect data 412: digital effect data (e.g., filters, stickers, or other annotations or enhancements) that represents digital effects to be applied to message image payload 406, message video payload 408, or message audio payload 410 of the message 400. Digital effect data for a sent or received message 400 may be stored in the digital effect table 310.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message collection identifier 418: identifier values identifying one or more content collections (e.g., "stories" identified in the collections table 316) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

Message reveal location 426: The message 400 may also include a message reveal location parameter 426, which specifies a real-world destination where the message should be displayed in an augmented reality (AR) environment.

Consistent with some examples, the messaging system in an AR chat app leverages various message parameters and structures to create rich, context-aware experiences that seamlessly integrate with the user's physical surroundings. The message reveal location parameter 426 specifies where the message should be displayed in the real world environment, using coordinates, semantic tags, or relative positions. This works in conjunction with the message geolocation parameter 416 to provide location-based context. The message duration parameter 414 controls temporal aspects of message display, influencing depth-based positioning within 3D chat threads. Messages are grouped into spatially-anchored chat threads using the message collection identifier 418. The message tag 420 helps determine appropriate spatial positioning in relation to detected objects in the user's environment. By utilizing these parameters, along with geolocation data and tags, the AR system can create spatially and contextually relevant message displays that integrate seamlessly with the user's physical surroundings, enabling a more immersive and intuitive messaging experience.

The contents (e.g., values) of the various components of message 400 may be pointers to locations in tables within which content data values are stored. For example, an image value in the message image payload 406 may be a pointer to (or address of) a location within an image table 314. Similarly, values within the message video payload 408 may point to data stored within a video table 314, values stored within the message digital effect data 412 may point to data stored in a digital effect table 310, values stored within the message collection identifier 418 may point to data stored in a collections table 316, and values stored within the message sender identifier 422 and the message receiver identifier 424 may point to user records stored within an entity table 306.

Spatial Friend Feed

Figure 5:
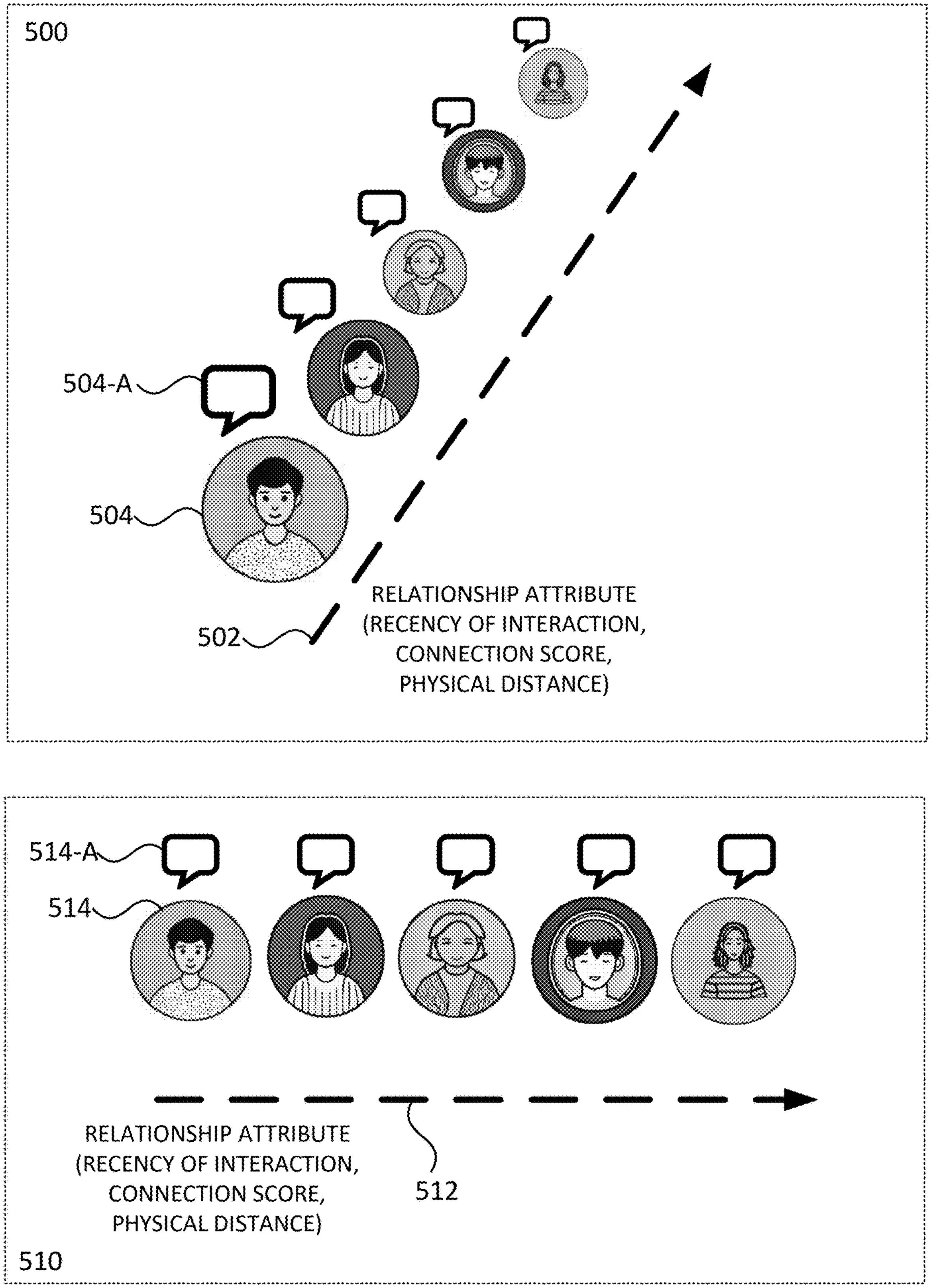
FIG. 5 is a user interface diagram illustrating examples of a user interface for the presentation of a spatial friend feed, in 3D or AR space, as may be presented by a spatial computing device, such as a head-worn AR device (e.g., glasses), consistent with some examples.

FIG. 5 shows a pair of user interface diagrams illustrating examples of user interfaces for the presentation of a spatial friend feed, in 3D or AR space, as may be presented by a spatial computing device, such as a head-worn AR device (e.g., smart glasses), consistent with some examples. A first user interface example referenced by number 500 presents several icons or user interface elements representing the friends or social connections of the viewing end-user (e.g., the person wearing the AR device). As indicated by the arrow 502, these user interface elements are presented at different depths, with element 504 perceived as closest to the viewer and successive user interface elements appearing smaller to indicate greater depth or distance from the point at which the viewing end-user is viewing the user interface. The arrow 502 is shown for explanatory purposes and is not intended to form a part of the actual user interface as presented to the viewing end-user.

The arrangement of visual representations for social connections in this 3D spatial friend feed can be determined by various relationship attributes between the viewer and each social connection. These attributes can be used to manipulate the user interface in several ways:

Recency of Interaction: As mentioned in the example, the depth of each user interface element can correspond to how recently a particular friend sent or received a message from the viewer. More recent interactions would be represented by elements closer to the viewer, while less recent interactions would appear further away. Interactions may be messages exchanged but could also be based on a variety of other types of interactions facilitated via the interaction system.

Communication Frequency: The depth, size or prominence of each visual representation could be adjusted based on how often the viewer communicates with that social connection.

Frequent communication partners might appear larger or more prominently positioned in the 3D space or may be positioned nearer (at less depth) from the perspective of the viewing end-user.

Relationship Closeness Score: A numerical value indicating the overall strength of the relationship could influence the positioning of the visual representation. Closer friends might appear in more central or easily accessible positions within the 3D space.

Shared Experiences: The number or significance of joint activities or events attended together could be represented by the visual characteristics of the user interface elements. For example, friends with more shared experiences might be presented closer, and have more detailed or colorful representations.

Content Similarity: The degree to which users share similar interests or content could be reflected in the positioning and/or grouping or clustering of visual representations in the 3D space. Friends with similar interests might appear closer together or share visual characteristics.

Physical Proximity: The real-world geographic distance between users could be represented in the virtual 3D space, with physically closer friends appearing nearer to the viewer.

The system leverages relationship attributes stored in the user management system to dynamically generate and update the 3D spatial friend feed. The ordering and positioning of visual representations for friends or social connections can be based on a single respective relationship attribute or a combination of attributes. For more complex arrangements, a weighted combination of multiple relationship attributes may be used to determine the overall positioning.

Specifically, the order in which friends are displayed can be determined by one primary relationship attribute, such as communication frequency or a composite "relationship closeness score." Alternatively, the system can use a weighted algorithm that considers multiple factors, giving more importance to certain attributes over others based on user preferences or system-defined priorities.

In addition to the linear ordering, the depth positioning of friend representations in the 3D space is a key feature of this spatial arrangement. The depth, or Z-axis position, can be utilized to convey additional information about the relationship. For example, friends with higher communication frequencies or stronger relationship scores may be positioned closer to the user's viewpoint (i.e., appearing larger and more prominent), while those with lower scores or less recent interactions may be placed further back in the 3D or AR space.

This multi-dimensional arrangement allows for a more nuanced representation of social connections. For instance, the X and Y axes could represent different attributes (e.g., communication frequency and shared interests), while the Z-axis (depth) could represent the recency of interactions. This creates a rich, informative spatial layout that intuitively conveys multiple aspects of each relationship.

As users interact with the system, send messages, or engage in shared experiences, these relationship attributes are continuously updated. The visual representation of the spatial friend feed adjusts accordingly, providing a dynamic and real-time reflection of the user's evolving social network. This adaptive nature of the interface ensures that the most relevant and active connections are always easily accessible, while also providing a visual history of how relationships change over time.

In addition to the spatial arrangement of friend representations, the user interface in the AR environment can convey a wealth of information through supplementary elements associated with each visual representation. The chat bubble with reference 504-A, for instance, may display information about a recent conversation (e.g., chat thread) between the viewer and the friend or social connection represented by the visual element 504. This feature allows users to quickly glean context about their recent interactions without needing to navigate to a separate chat interface.

The system can present a variety of icons and elements alongside each user interface element to reflect the status and relevant information about friends and social connections. Activity indicators, for example, might appear as small, color-coded dots or icons showing whether a friend is currently active on the platform, idle, or offline. This real-time status information helps users understand the availability of their contacts for potential interactions. Message counters could be implemented as numerical badges overlaid on the friend's visual representation, displaying the number of unread messages from each contact. This feature allows users to prioritize their communications at a glance.

Specifically for chat messages, the system incorporates distinct icons to indicate message status. A small notification icon, such as a pulsing dot or animated envelope, could appear on a friend's visual representation to signify a new unread message from that specific friend. This allows users to quickly identify which friends have sent new communications. Additionally, message delivery and read status indicators could be implemented as small icons or symbols adjacent to the friend's representation. These might take the form of checkmarks or other intuitive symbols that change color or style based on the message status. For example, a single gray checkmark might indicate a message has been delivered, while double blue checkmarks could signify the message has been read by the recipient. These visual cues provide users with immediate feedback on the status of their sent messages without the need to open individual chat threads.

To enhance the visual richness of the interface, shared content thumbnails could be displayed as miniature previews orbiting around the friend's representation. These thumbnails might showcase recently shared photos, videos, or other media between the viewer and the friend, providing a visual history of their recent interactions. Event reminders could be represented by calendar icons or small event-specific symbols, indicating upcoming shared activities or plans with the friend. This feature helps users stay informed about their social commitments within the context of their social network visualization.

Mood or status indicators offer another layer of expressiveness to the interface. Friends could set custom emoji or icons to represent their current mood or status, allowing for a more nuanced understanding of their contacts'current states. This feature adds a personal touch to the AR social experience, mimicking the kind of ambient awareness one might have of friends in physical proximity.

Location markers, represented as small map pins or location icons, could indicate a friend's current or most recently shared location. This feature could be particularly useful for coordinating meet-ups or understanding the geographic distribution of one's social network in real-time. Privacy settings would, of course, need to be carefully considered to ensure users maintain control over their location sharing preferences.

To gamify social interactions and encourage regular engagement, the system could incorporate visual representations of streaks or other interaction metrics. These could appear as chains, flames, or other symbols growing or intensifying based on consistent communication patterns between the viewer and each friend. Such features can serve to strengthen social bonds by incentivizing regular contact.

Shared interest icons, displayed as small symbols representing mutual interests or hobbies, could cluster around friend representations. These icons might depict activities, fandoms, or topics that the viewer and the friend have in common, facilitating conversation starters and highlighting potential areas for deeper connection.

All these additional elements, including the chat message-specific indicators, work together to enhance the informational density of the spatial friend feed. By leveraging the three-dimensional space and the unique capabilities of AR devices, this interface allows users to quickly and intuitively access a comprehensive overview of their social landscape and communication status. The spatial arrangement, combined with these rich, contextual elements, creates a dynamic and engaging social experience that goes beyond traditional two-dimensional social networking interfaces. This approach takes full advantage of the immersive nature of AR technology to provide users with a more natural and intuitive way to navigate their digital social connections and message interactions, seamlessly blending them with their physical environment.

The user interface can be interactive, allowing the viewer to navigate through the 3D space, zoom in on specific friends, or filter the view based on different relationship attributes. This creates a more intuitive and engaging way for users to interact with their social connections in an AR environment, leveraging the unique capabilities of spatial computing devices to provide a rich, context-aware social experience.

The example user interface with reference 510 in FIG. 5 demonstrates how relationship attributes can be used to arrange the visual representations (e.g., friend representations 514, each with a chat indicator 514-A) of friends or social connections in a particular direction (as shown by the relationship attribute axis 512), such as from left to right, at the same general depth, according to some examples. This arrangement provides an alternative visualization of the spatial friend feed that may be more intuitive for some users.

The relationship attribute used to order the visual representations could be based on various factors, such as:

- Communication frequency: Friends with whom the user communicates more often could be positioned further to the right (or left, depending on the configuration).
- Relationship closeness score: A composite score based on multiple factors could determine the ordering, with closer friends appearing further to one side.
- Recency of interaction: The most recently contacted friends could be positioned at one end of the arrangement, with less recent interactions moving towards the other end.
- Alphabetical order: A more traditional approach could be used, arranging friends based on their names.

Consistent with some examples, the spatial friend feed interface can be highly customizable, allowing each end user to configure the presentation according to their preferences. Through a settings menu, users can select from different visualization formats, such as the orbital arrangement shown in example 500, the left-to-right layout depicted in example 510, or the celestial-inspired pattern illustrated in FIG. 6 (described below). This flexibility enables users to choose the spatial representation that feels most intuitive and engaging to them.

Furthermore, in some examples, the system provides granular control over the relationship attributes used to determine the positioning of friends and social connections within the chosen layout. Users can specify one or more attributes to be considered, such as communication frequency, relationship closeness score, or recency of interaction. For instance, a user might prioritize communication frequency for the X-axis positioning, while using the relationship closeness score to determine the depth (Z-axis) placement. The system also allows for weighted combinations of multiple attributes, giving users the ability to fine-tune the relevance of different factors in the overall arrangement.

These configuration options are accessible through an intuitive settings interface within the AR environment, allowing users to experiment with different layouts and attribute combinations in real-time. As users adjust these settings, the spatial friend feed dynamically updates, providing immediate visual feedback on how different configurations affect the representation of their social network. This level of customization ensures that each user can tailor the spatial friend feed to best suit their personal preferences and social interaction patterns, maximizing the utility and engagement of the AR social experience.

Consistent with some examples, the system can be designed to automatically update the presentation of the spatial friend feed in real-time as it detects activity between users. For example:

- When a message is sent or received, the system could immediately adjust the position of the relevant friend's visual representation, moving it towards the "more recent" end of the arrangement.
- As communication frequency changes over time, the system could gradually shift the positions of friends to reflect these changes, providing a dynamic visualization of the user's social interactions.
- If a new shared experience or event occurs between users, the system could update the relationship closeness score and adjust the friend's position accordingly.

This real-time updating creates a dynamic and responsive user interface that reflects the current state of the user's social connections. The ability to configure the display direction (left-to-right or right-to-left) and potentially the specific relationship attribute used for ordering could allow users to customize the spatial friend feed to their preferences, enhancing the overall user experience in the AR environment.

In some embodiments of the invention, a separate graphic or icon may be presented to show the status of each friend or social connection, specifically indicating whether that friend or social connection is actively interacting with the interaction system and thus available to receive communications in real-time. This status indicator may take the form of small, color-coded dots or icons showing whether a friend is currently active on the platform, idle, or offline.

Furthermore, the status indicator may also convey information about the particular type of device being used by the friend or social connection, and whether that user's device is capable of spatial computing. This additional information could be represented through specific icons or visual cues, allowing the viewing user to understand not only the availability of their contacts but also the nature of the device they are using and its capabilities for AR interactions.

The user interface presented in the AR environment is highly interactive, allowing the viewing user to select icons, graphics, or user interface elements to invoke various actions. This selection can occur through multiple input methods compatible with AR devices, including:

- Hand gestures: Users can reach out and "touch" or "grab" virtual elements in the AR space.
- Eye tracking: The AR device can detect where the user is looking and interpret prolonged gaze as a selection.
- Voice commands: Users can issue verbal instructions to interact with the interface.
- Head movements: Subtle head gestures could be used for navigation or selection.
- Controller input: If the AR device includes a handheld controller, it can be used for pointing and selection.

These various input methods allow for intuitive and natural interactions within the AR environment, enabling users to easily navigate their spatial friend feed, initiate communications, or access additional information about their social connections.

The user interface is designed to be dynamically updated in real-time as interactions between users or social connections occur. For example:

- When a message is sent or received, the system could immediately adjust the position of the relevant friend's visual representation, moving it to reflect the recent interaction.
- If a friend posts new content or initiates a new chat, the associated icon would appear or update instantly.
- As communication frequency or relationship closeness scores change over time, the system could gradually shift the positions of friends within the spatial arrangement to reflect these changes.
- Status indicators would update in real-time as friends come online, go offline, or change their activity status.

This real-time updating creates a dynamic and responsive user interface that continuously reflects the current state of the user's social connections, providing an engaging and informative AR social experience.

Figure 6:
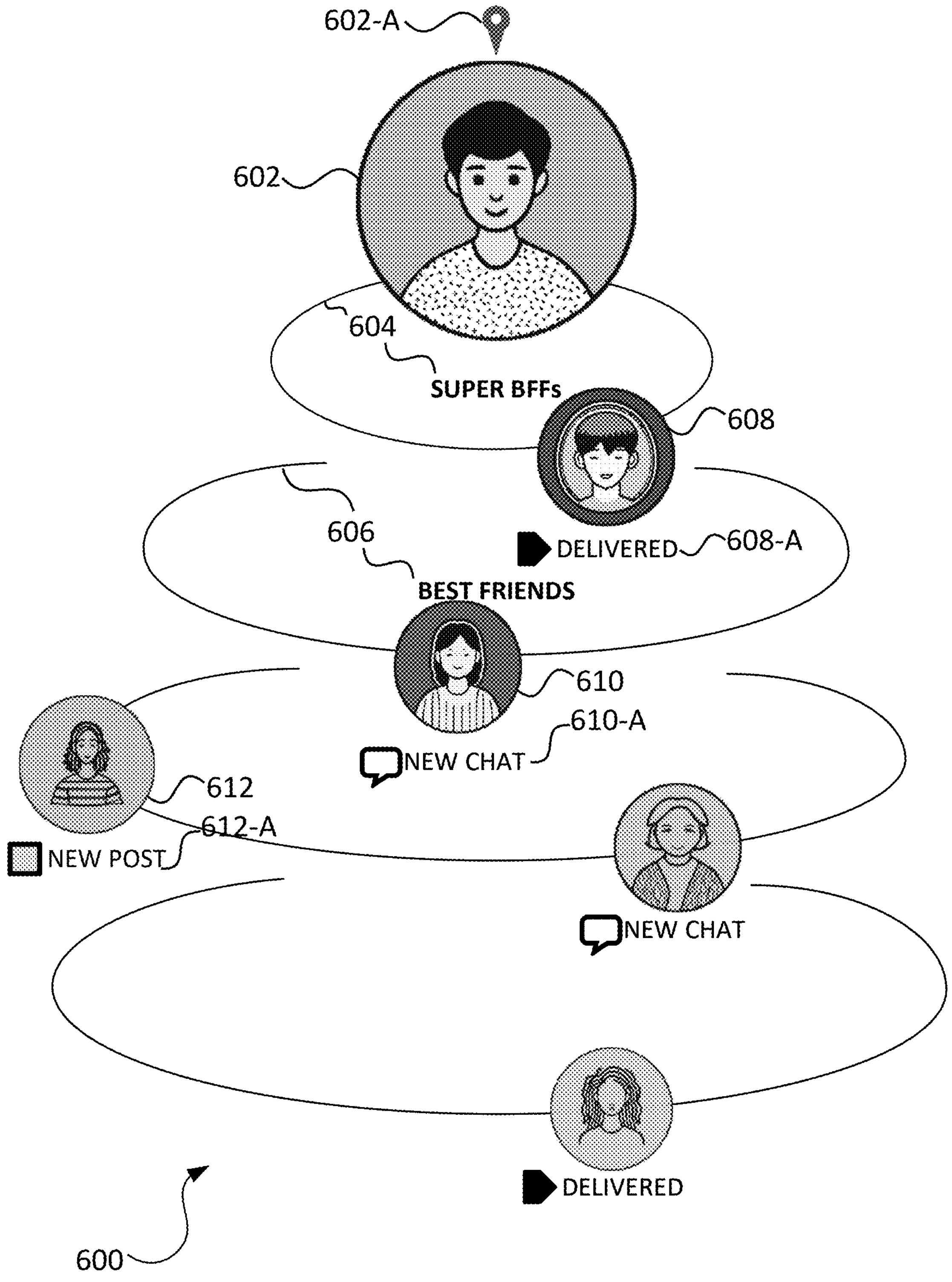
FIG. 6 is a user interface diagram illustrating an example of a spatial friend feed presented as a celestial-inspired arrangement in 3D space, according to some examples.

FIG. 6 illustrates a spatial friend feed arrangement 600 presented as a galaxy or arrangement of celestial bodies, where visual representations of friends or social connections are positioned in 3D space based on one or more relationship characteristics or attributes, according to some examples. The visual representation of each friend or social connection is arranged in orbital-like circles, with the visual representation of the friend or social connection 602 having the closest or strongest relationship to the viewing end-user positioned atop the topmost circle 604. The friend represented by visual element 602 is shown in the highest or top-level circle labeled "Super BFFs" or super best friends forever, indicating the closest or strongest connection to the viewing end-user.

Each circle (e.g., 604 and 606), in the spatial friend feed represents a different range of the relationship attribute being used to position friends. For example, when using a closeness score, friends with the lowest scores appear in the bottom circle, while those with the highest scores are placed in the smaller top circle. The intervening circles represent progressively higher ranges of the closeness score. Other metrics, such as communication frequency or recency of interaction, could be used instead, resulting in different arrangements of friends among the orbits.

In some embodiments, the spatial friend feed may be animated, with the visual representation of each friend or social connection continuously orbiting around an imaginary central axis. This creates a circular pattern of movement similar to how planets orbit a star. This animation enhances the engagement factor of the spatial friend feed by adding dynamic visual interest to the interface. The constant motion draws the user's attention and makes the representation of social connections feel more alive and interactive. Additionally, this planetary-like motion reinforces the metaphor of a social "galaxy," making the interface more intuitive and memorable for users.

For each visual representation of a friend or social connection, additional icons or graphics provide supplementary information:

- The friend represented by visual element 612 has an associated icon 612-A, indicating that this particular friend or social connection has posted new content to a feed that is now visible or viewable by the viewing user.
- The friend represented by visual element 608 includes a separate icon or graphic 608-A, indicating that a message has recently been delivered to this friend or social connection.
- The friend represented by visual element 610 is shown with a separate icon or graphic 610-A, indicating that a new message or new chat has been initiated between this friend and the viewing user.

These additional icons and graphics allow users to quickly glean important information about their social connections, such as recent activities, unread messages, or new content, without needing to navigate to separate interfaces. This arrangement in a galaxy-like formation provides an intuitive visualization of the user's social network, with the orbital positioning reflecting the strength or closeness of each relationship.

The spatial arrangement of friends in this galaxy-like visualization allows for a more dynamic and engaging representation of the user's social connections in the AR environment. It leverages the three-dimensional capabilities of AR technology to present a rich, at-a-glance overview of the user's social landscape, combining relationship strength indicators with real-time status updates and interaction notifications.

Chat in 3D or AR Space

Consistent with some examples, a 3D chat application in an AR environment can operate in multiple modes to accommodate users with different types of devices, ranging from conventional client devices to advanced spatial computing devices. This multi-modal approach allows for seamless communication between users regardless of their device type. Conventional client devices may include mobile phones (smartphones), tablets, laptops, and desktop computers, while spatial computing devices may include head-worn AR devices, mixed reality headsets, smart glasses, and other wearable AR/MR devices.

The server functionality of the chat application facilitates communication in a mixed-mode manner, enabling users with different device types to exchange messages and interact within the same virtual environment. This is achieved through a communication system that translates and adapts the content and interactions to suit the capabilities of each user's device. For example, a user with a conventional smartphone might see a 2D representation of the chat interface, while a user with an AR headset experiences the same conversation in a fully immersive 3D environment. The server and respective client software application operate in combination to ensure that messages and interactions are properly formatted and delivered to each user's device in a way that is compatible with their hardware and software capabilities.

The user interfaces presented in the chat application may include indicators that show what type of device another user is actively using. This information allows users to understand the capabilities and limitations of their conversation partners'devices, helping them choose the most appropriate form of communication for each interaction. For instance, if a user sees that their friend is using an AR headset or AR-enabled smart glasses, they might choose to send a 3D model or spatial audio message, knowing that the recipient can fully experience these rich media types. Conversely, if they see that a friend is using a mobile phone, they might opt for text or simple image-based communication.

This device awareness feature enables users to tailor their communication style and content to best suit the recipient's current device capabilities, enhancing the overall user experience and ensuring effective communication across different platforms within the same chat application. By providing this information, the system allows users to make informed decisions about how to communicate most effectively, taking into account the technological context of their interactions and optimizing the exchange of information and ideas within the mixed-device environment.

Figure 7:
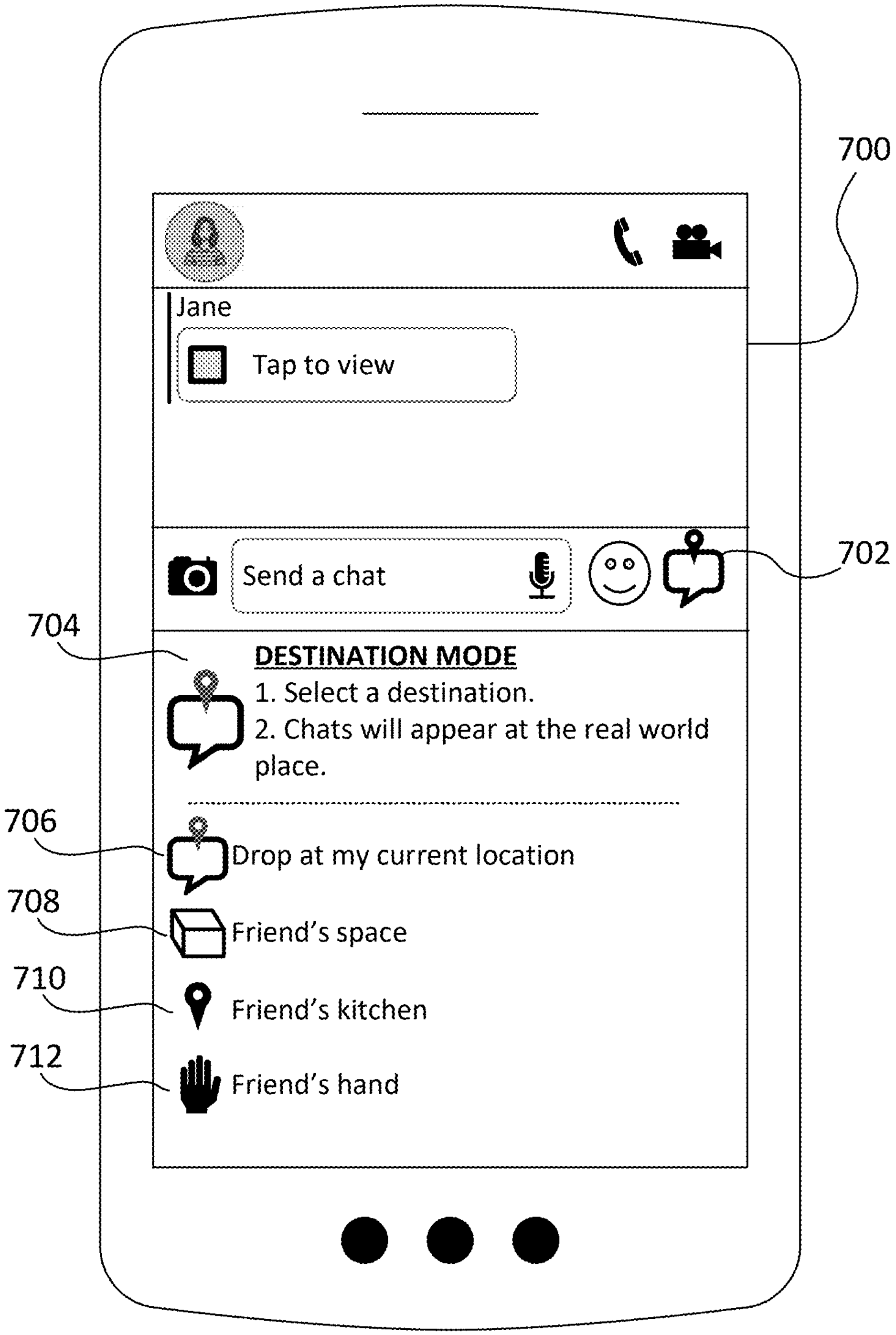
FIG. 7 is a user interface diagram illustrating an example of a chat application interface on a conventional mobile device for sending messages to specific real-world destinations, according to some examples.

FIG. 7 illustrates a user interface 700 for a chat application as presented on a conventional mobile phone, consistent with some examples. This example user interface includes a user interface element 702 that allows the end user to create and send a message in "destination mode" 704. In destination mode, the message sender can select a specific destination where the message recipient will receive and view the message.

After selecting the icon 702, the user is presented with several options for sending a message to another end-user, Jane in this example. One of these options is represented by icon 706, which allows the message sender to leave the message at their current location. If this option is selected, the message recipient (Jane) will only receive the message on her device when she enters that specific location. In some embodiments, destination mode may be exclusive to AR devices.

However, in other embodiments, destination mode may work with both AR and conventional devices.

Consistent with some examples, the implementation of this location-based messaging feature involves both the client device and the interaction servers. On the client side, the mobile application needs to capture and transmit the sender's current location along with the message content. This could be achieved using the device's GPS capabilities or other location services.

On the server side, the system stores the message along with its associated location data. The server also continuously monitors the recipient's location (when permitted) to determine when they enter the specified location where the message was left.

There are several ways in which location might be determined and tracked:

GPS: The most common method for outdoor locations, using satellite signals to determine precise coordinates.

Wi-Fi positioning: In indoor environments or urban areas, the system could use Wi-Fi access points to triangulate the user's position.

Cellular network triangulation: Using signals from multiple cell towers to estimate the device's location.

Bluetooth beacons: In specific indoor locations, Bluetooth low energy beacons could be used for precise positioning.

Geofencing: The server could create virtual boundaries around specific locations and trigger message delivery when a user enters or exits these areas.

Computer vision algorithms: These process images obtained via image sensors (cameras) and recognize objects depicted in the images to infer locations. This method can be particularly useful in AR environments where visual data is readily available.

Consistent with some embodiments, any of the aforementioned techniques may be used in combination to enhance accuracy and reliability of location tracking. By integrating multiple methods, the system can leverage the strengths of each approach while mitigating their individual limitations. For example, GPS data could be combined with Wi-Fi positioning for improved accuracy in urban environments, or computer vision algorithms could supplement Bluetooth beacon data for more precise indoor positioning.

This multi-modal approach to location tracking allows the chat application to adapt to various environmental conditions and device capabilities, ensuring a more robust and versatile location-based messaging experience across different scenarios and user contexts.

The server continuously compares the recipient's location data with the stored message locations. When a match is detected (i.e., the recipient enters the location where a message was left), the server would trigger the delivery of the message to the recipient's device.

To ensure privacy and battery efficiency, the system implements various strategies, such as allowing users to control when their location is tracked, using low-power location monitoring on mobile devices, and ensuring that location data is securely encrypted and transmitted.

This location-based messaging feature leverages the unique capabilities of mobile devices and spatial computing to create a more context-aware and immersive messaging experience, blending digital communication with physical world locations.

In an alternative embodiment, the determination of whether an end user's device is in a location with a pending message sent in destination mode may occur on the client device, rather than the server. This approach can offer advantages in terms of privacy and reduced server load.

When a user sends a message in destination mode, the message content and associated location information are communicated from the sender's device to the recipient's device via a server. However, instead of the server continuously monitoring the recipient's location, the messaging application executing on the recipient's client device is responsible for determining when to present the message to the end user.

The process works as follows: When a user sends a message in destination mode, they specify the intended real-world destination for the message. The sending device captures this location information along with the message content. The sending device then transmits the message content and associated location data to the server, which forwards this information to the recipient's device.

Upon receiving the message, the recipient's device stores it locally, along with the associated location data. The message is not immediately displayed to the user. Instead, the messaging application on the recipient's device continuously monitors the device's location using one or more methods such as GPS, Wi-Fi positioning, cellular network triangulation, or other location services.

The application compares the device's current location with the stored location data associated with pending messages. When the application detects that the device's location matches the specified destination of a stored message, it triggers the presentation of that message to the user.

For example, if Alice wants to send a location-based message to Bob about a coffee shop, she would compose the message and set its destination to the coffee shop's location. Alice's device sends the message content and coordinates to the server, which forwards it to Bob's device. Bob's device receives and stores the message locally without displaying it. As Bob moves around, his messaging app monitors his location. When Bob approaches the coffee shop, his device detects the location match and displays Alice's message.

This client-side approach offers several benefits, including enhanced privacy as the user's location is not continuously shared with the server, reduced server load, potential offline functionality for message delivery, and the ability to optimize battery usage. However, it requires careful implementation to manage battery consumption and ensure timely message delivery.

In an alternative embodiment where the message sender is using an AR device and selects to send a message using destination mode, the process of "dropping" the message at the current location leverages the advanced capabilities of AR technology. When the sender chooses to leave a message at their current location, the AR device employs a combination of location sensing technologies to determine and record the precise location.

The AR device utilizes multiple data sources to establish the current location with high accuracy. This includes GPS coordinates for outdoor positioning, as well as Wi-Fi positioning and cellular network triangulation for improved accuracy, especially in urban or indoor environments.

Additionally, the AR device's computer vision capabilities play a role in this process.

As the sender initiates the message drop, the AR device captures and processes images of the surrounding environment. Advanced computer vision algorithms and machine learning models analyze these images to identify and catalog objects, spatial arrangements, and distinctive features of the location. This generates rich metadata about the sender's environment, which is then associated with the message.

The combination of coordinate data, network information, and the generated metadata creates a comprehensive location profile for the message. This profile is more nuanced and context-aware than simple GPS coordinates, allowing for more accurate message delivery in the future.

When the message is sent, this detailed location profile is transmitted along with the message content to the server or directly to the recipient's device, depending on the system architecture. The location profile serves as a multi-dimensional "address" for the message.

For the message recipient, their AR device continuously analyzes their surroundings using the same combination of technologies. As they move through different environments, their device compares the current location data and environmental metadata against the profiles of pending messages.

When the recipient enters a location that closely matches the profile of a pending message, their AR device triggers the message delivery. This match is determined not just by proximity to GPS coordinates, but by a holistic comparison of the location profile, including identified objects and spatial arrangements.

For example, if the sender left a message in a specific coffee shop, the recipient's AR device would look for a match in GPS coordinates, Wi-Fi networks, and the presence of objects typically found in coffee shops (e.g., espresso machines, cafe-style seating). This multi-faceted approach ensures that the message is delivered in the correct context, even if the GPS coordinates are slightly off or if the recipient is in a similar but different location.

This AR-enhanced approach to location-based messaging offers several advantages. It provides more precise and context-aware message delivery, reduces false positives in location matching, and creates a more immersive and seamless integration of digital communication with the physical world. Moreover, it leverages the unique capabilities of AR devices to blur the line between digital and physical spaces, offering users a truly spatial computing experience.

Referring again to the user interface of FIG. 7, a message sender can select the icon with reference number 708 to send a message to a location that has been specified or designated by another end-user as their personal space. This feature allows each end-user to define one or more specific locations at which they would like to receive messages, enhancing the personalization and context-awareness of the messaging experience.

Users can configure their personal space as part of their profile settings. This configuration can be stored on either the client device or the server, depending on the system architecture. When a user creates or defines a specific space at which they'd like to receive messages, this information becomes part of their user profile.

To define their personal space, users have multiple options available. They can interact with a map interface to indicate their particular space by selecting a specific location on a digital map, drawing boundaries, or dropping pins to mark areas of interest. Alternatively, users can utilize their AR device to capture images of their environment, creating a digital map in the AR sense. In the context of AR, this involves generating a three-dimensional representation of the physical space, including spatial mapping and object recognition. The AR device employs its cameras and sensors to scan the environment, creating a digital twin of the physical space that can be used for anchoring digital content.

Users may also define their personal space as a type of space rather than a specific physical location. For example, a personal space could be defined as a coffee shop, sports arena, restaurant, or classroom. In this scenario, the AR device can capture images of a space at the user's request and associate various objects identified in the space with a space type. For instance, if a user defines their personal space as a "coffee shop," the AR device might capture images of the current environment and use computer vision algorithms to identify objects typically found in coffee shops, such as espresso machines, cafe-style seating, or counter service areas. These identified objects are then associated with the "coffee shop" space type in the user's profile or as part of a system profile.

As an example, consider a user who wants to set their personal space as "classroom." They can use their AR device to scan their current classroom environment. The device's computer vision system identifies objects such as desks, a whiteboard, and bookshelves. These objects are then associated with the "classroom" space type in the user's profile. Later, when the user enters any space that contains similar objects (desks, whiteboards, bookshelves), the system recognizes it as matching the "classroom" space type and allows messages to be received in that context. This approach enables more flexible and context-aware message delivery, as it doesn't rely on predefined coordinates but rather on the semantic understanding of different types of spaces.

Once a user has defined their personal space, this option (indicated by icon 708) can be presented to their friends and social connections when they attempt to send a message. This allows the message sender to select the recipient's predefined space as the destination for their message.

The process for configuring and utilizing personal spaces for message delivery in the chat application can be described as follows. Users can access their profile settings within the application to define their personal space, which may involve selecting a specific geographic location, a particular room in their home, or even a virtual space within an augmented reality (AR) environment.

This personal space information is then securely stored on the server as part of the user's profile data, ensuring accessibility across different devices and to authorized connections. When a user defines or updates their personal space, this information is propagated to their friends' and social connections'contact lists.

During message composition, friends or social connections are presented with the option to send messages to the recipient's personal space, as indicated by icon 708 in the user interface. If the sender chooses this option, the message is tagged with the recipient's personal space location data. The server then manages the delivery of the message based on the recipient's presence in that specified location.

The message delivery process can be implemented in two ways, depending on the system architecture and privacy considerations. In one approach, the message may be maintained at the server until the intended recipient is determined to be in their designated personal space. The server continuously monitors the recipient's location, using data from their AR device or other location services, and only delivers the message when the recipient enters the specified personal space. This method ensures that messages are delivered precisely when and where the sender intended, while also potentially reducing unnecessary data transfer to the recipient's device.

Alternatively, the message may be sent immediately to the intended recipient's device, where the messaging application takes on the responsibility of monitoring and delivering pending messages. In this scenario, the AR device continuously analyzes its surroundings and compares them to the personal spaces associated with pending messages. When the AR device determines that the recipient has entered a space matching a pending message's designated location, it presents the message to the user. This approach leverages the AR device's advanced computer vision and spatial awareness capabilities to provide a more immediate and context-aware messaging experience, while also potentially offering enhanced privacy by keeping location monitoring local to the user's device.

To ensure privacy and control over location-based messaging preferences, with some embodiments, users can manage who can see and use their personal space for message delivery. This feature allows for a more contextual and personalized messaging experience while maintaining user control over their privacy settings. This feature adds a layer of personalization to the location-based messaging system, allowing recipients to curate where they receive certain messages. It could be particularly useful in AR environments, where users might designate specific virtual or mixed-reality spaces for different types of communications.

For example, a user might define their home office as their "work message space" and their living room as their "social message space." Friends and colleagues could then choose the appropriate space when sending messages, ensuring that the recipient receives the message in the most contextually relevant location.

This system leverages the spatial awareness capabilities of modern devices and AR technologies to create a more immersive and context-aware messaging experience, bridging the gap between digital communication and physical or virtual spaces.

Referring again to the user interface 700 of FIG. 7, a message sender can select icon 710 to send a message to a specific room or location, such as a friend's kitchen. This location may be predetermined, for example, by physical coordinates, and presented to the recipient based on the recipient's device reporting that it is in the location specified by the message sender.

Alternatively, the space may not be predefined but may be specified generically, such that images analyzed by the AR device of the message recipient can be used to determine whether the message recipient is in the location or space that corresponds with that specified by the end-user. In this example, the images could be analyzed to determine that the message recipient is in a kitchen.

To accomplish this, the AR device would employ advanced computer vision algorithms and machine learning models trained on vast datasets of indoor environments. These algorithms would analyze the captured images for key features typically found in kitchens, such as countertops, appliances (e.g., refrigerators, stoves), cabinets, and sinks. The system would also consider the spatial arrangement of these elements to differentiate a kitchen from other rooms that might contain similar objects.

In another example, a message sender might select or specify a space such as a coffee shop or a restaurant. The AR device of the recipient would then need to analyze images to make a determination as to whether the message recipient is in such a location before presenting the received message.

To enhance the accuracy and efficiency of location-based message delivery, the system may maintain a sophisticated taxonomy or classification of physical spaces on the server, which can also be distributed to client devices. This taxonomy combines physical coordinates with associated metadata representing objects typically found in those locations. The server's database would store information about various types of spaces (e.g., kitchens, coffee shops, restaurants) along with their characteristic objects and spatial arrangements.

When an AR device captures images of its surroundings, it employs advanced computer vision algorithms and machine learning models to detect and identify objects within the environment. These detected objects are then compared against the metadata stored in the server's taxonomy. The system looks for matches between the objects identified in the real-world environment and the objects associated with specific location types in the taxonomy.

For example, if the AR device detects objects such as espresso machines, cafe-style seating, and a counter service area, it would compare this data against the taxonomy. The system might find that this combination of objects strongly correlates with the "coffee shop" classification in the taxonomy. Additionally, if the AR device can determine its physical coordinates (e.g., through GPS or other positioning technologies), it can cross-reference this location data with the coordinates stored in the taxonomy for known coffee shop locations.

By combining object recognition with physical coordinate matching, the system can make a more robust determination of the user's current space type. This approach allows for accurate identification even in cases where the physical coordinates might be imprecise or where the space type is not tied to a specific set of coordinates (e.g., a "kitchen" could exist in many different physical locations).

The system can also employ machine learning algorithms to continuously improve its classification accuracy. As users interact with the system and confirm or correct space type determinations, this feedback can be used to refine the taxonomy and improve future classifications. This adaptive approach allows the system to handle a wide variety of environments and account for regional or cultural differences in how spaces are organized and used.

In practice, this method enables the AR device to quickly and accurately determine whether a user has entered a specific type of space, such as a kitchen or a coffee shop, without relying solely on predefined physical coordinates. This context-aware approach significantly enhances the relevance and timeliness of message delivery in the AR messaging system.

With some examples, sending a message in destination mode may work as follows,

- The message sender selects a generic location type (e.g., "coffee shop") when sending the message.
- The message, along with its associated location type, is stored on the server.
- The recipient's AR device continuously captures and analyzes images of the user's environment.
- The device's computer vision algorithms process these images, looking for characteristics typical of the specified location type. For a coffee shop, this might include the presence of espresso machines, cafe-style seating, menu boards, or counter service areas.
- The system may also utilize additional contextual information, such as GPS data or Wi-Fi network names, to support its determination.
- If the system determines with a high degree of confidence that the user is in the specified type of location, it triggers the presentation of the message.

This approach allows for more flexible and context-aware message delivery, as it doesn't rely on predefined coordinates but rather on the semantic understanding of different types of spaces.

The message sender using interface 700 can select icon 712 to send a message that is only viewable when the message recipient is looking at a particular object, such as their hand or other body parts or objects in the environment. This feature enhances the contextual and immersive nature of messaging in augmented reality (AR) environments.

When a message is created and associated with a specific object or body part using the interface 700 and icon 712, the message content, along with its associated object data, is securely stored on the server. This could include detailed information about the target object, such as its shape, color, and expected location (e.g., "user's left hand" or "kitchen countertop").

The AR device's camera continuously captures images of the user's environment, processing them in real-time using sophisticated computer vision algorithms. These algorithms employ advanced object recognition techniques to identify and classify objects within the captured images, potentially using machine learning models trained on vast datasets of objects and body parts.

When an object is detected, the system compares it against the object associated with the pending message. This comparison involves analyzing features such as shape, size, color, and texture. For instance, if the message is associated with a hand, the system would look for skin tone, the characteristic shape of a human hand, and the presence of fingers.

The AR device also utilizes eye-tracking technology to determine where the user is looking within their field of view. This gaze tracking is essential for ensuring that the message is only revealed when the user is actively looking at the correct object. When the system detects that the user is looking at the specified object (e.g., their hand) and confirms a match with the object associated with the message, it triggers the message display. The AR device then renders the message content in the user's field of view, anchoring it to the associated object in 3D space. This could involve overlaying text, images, or even 3D models onto or near the object.

The message may remain visible as long as the user continues to look at the object, or it may persist in the AR environment for a specified duration. For example, a message attached to a hand might remain visible for 30 seconds after initial viewing, allowing the user to interact with it or take notes. The system may also allow for interaction with the message content through gestures or voice commands, such as swiping to dismiss the message or speaking a command to reply.

This system leverages the spatial awareness and computer vision capabilities of AR devices to create a highly contextual and immersive messaging experience. It allows for precise, object-specific message delivery that integrates seamlessly with the user's physical environment, enhancing the connection between digital communication and the real world. For instance, a user could leave a personal note attached to a friend's hand, creating unique and memorable messaging experiences.

Figure 8:
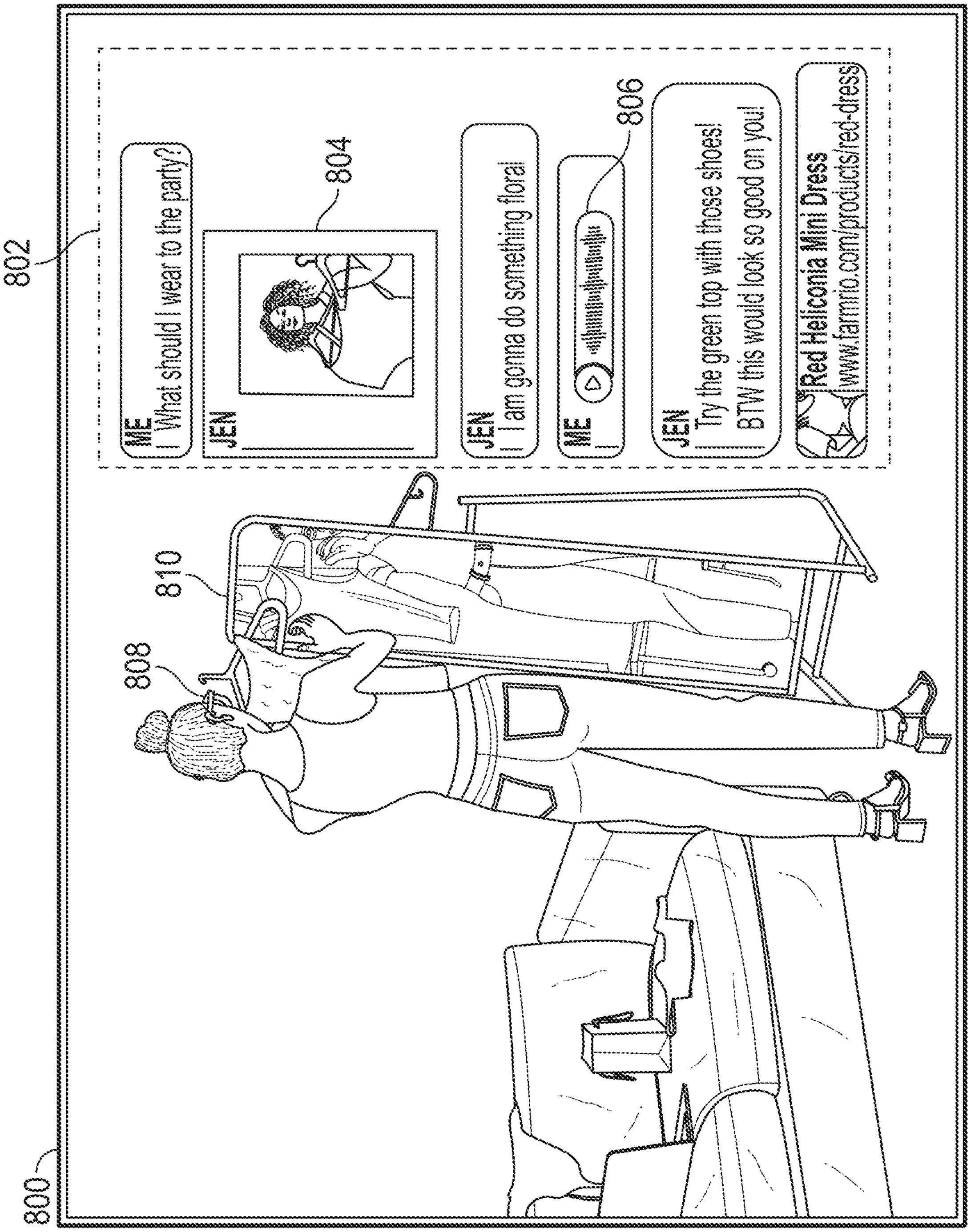
FIG. 8 is a user interface diagram illustrating an example of a chat thread displayed in an augmented reality environment, anchored to a real-world object, according to some examples.

FIG. 8 illustrates a real-world environment 800 in which a message recipient, wearing AR smart glasses, is participating in a chat session, consistent with some examples. The system operates through an interplay between the client device (AR smart glasses) and the server, leveraging advanced computer vision, natural language processing, and spatial computing technologies to create a contextually relevant and immersive messaging experience.

On the client side, the AR device continuously captures images of the user's environment through its integrated camera. The device's onboard computer vision algorithms process these images in real-time to detect and identify objects in the user's surroundings. In the scenario depicted in FIG. 8, the system has detected a mirror, represented by reference number 810, in the user's environment.

Simultaneously, the server side of the system is responsible for processing and analyzing the content of incoming messages and entire chat threads. When a new message is received, the server employs a prompt generator to create a prompt for a generative language model. This prompt includes the content of the message or the entire message thread as context, along with an instruction directing the generative language model to identify a predetermined number of possible topics or subject matters to which the message or thread relates.

The generative language model processes this prompt and returns a list of potential topics. The server then associates these topics with the message or thread and communicates this information to the receiving device. This process allows the system to understand the context and subject matter of the conversations taking place.

As the AR device detects objects in the user's environment, it compares these objects with the topics or subject matters associated with the conversation. When a correlation is found between the content of the thread or a message and objects detected in the real-world environment, the system determines an appropriate location or position, within the environment, to display the message or messaging thread in AR or 3D space.

In the example illustrated in FIG. 8, the chat thread represented by the bounding box with reference number 802 is positioned in 3D or AR space so that it appears anchored to or next to the detected mirror 810. This positioning is the result of several factors:

- The message recipient may have previously elected to associate chat threads related to certain topics with the mirror object.

The system may have analyzed the content of the messages and determined a topic that correlates with the mirror (e.g., discussions about appearance or getting ready).

The message sender may have specified the mirror as the intended display location for the message.

The AR device then renders the chat thread in the user's field of view, spatially anchoring it to the mirror. This creates a seamless blend of digital content with the physical environment, enhancing the contextual relevance of the conversation.

Throughout this process, the AR client device and server continuously communicate. The client device sends updates about detected objects and the user's interactions, while the server provides updated message content, associated topics, and positioning instructions. This ongoing exchange ensures that the AR experience remains dynamic and responsive to both the conversation's content and the user's physical environment.

This system demonstrates the powerful integration of AR technology with natural language processing and spatial computing, creating a messaging experience that is deeply intertwined with the user's physical surroundings and the context of their conversations.

Figure 9:
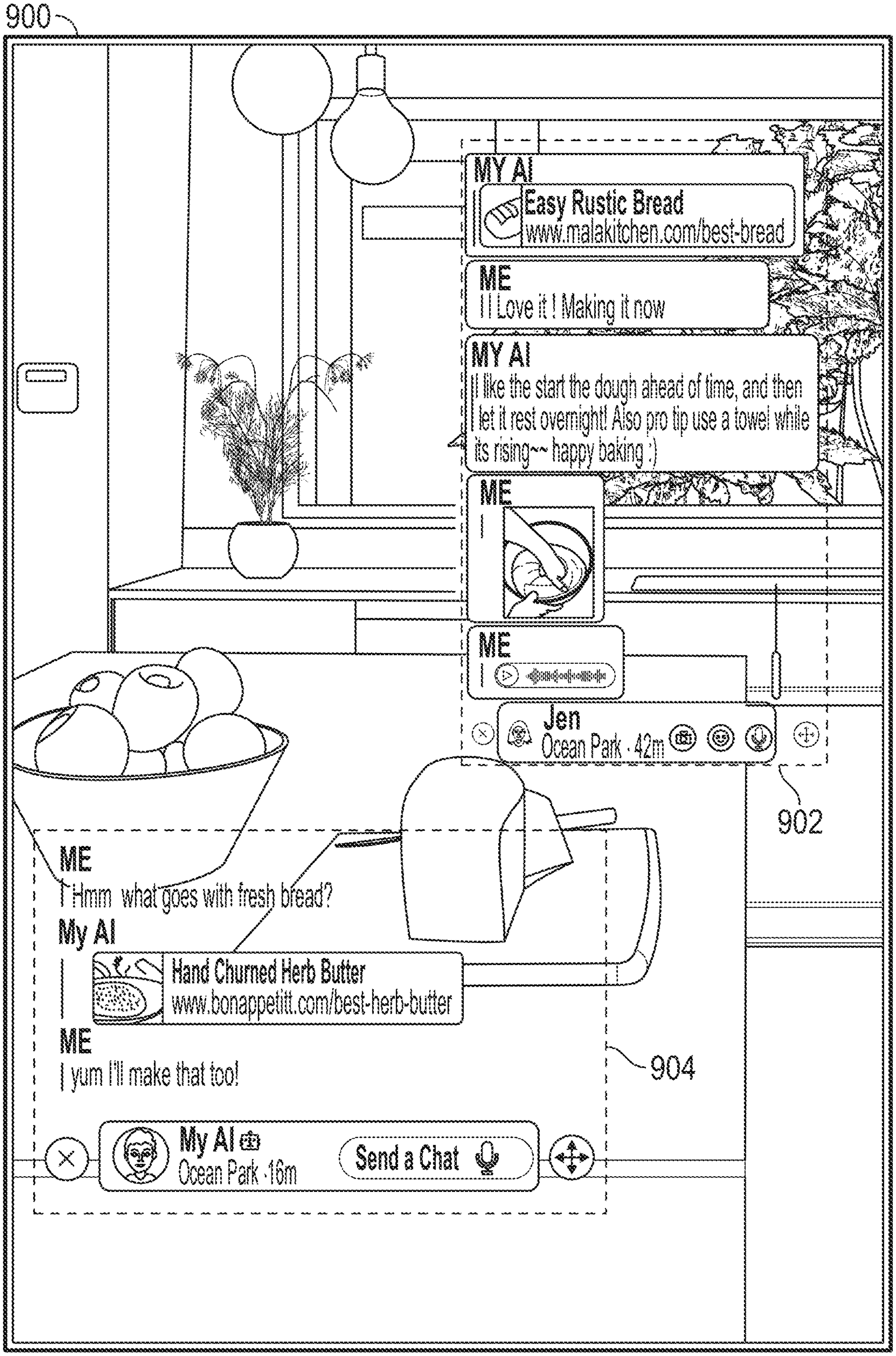
FIG. 9 is a user interface diagram illustrating an example of multiple chat threads displayed simultaneously in an augmented reality environment, according to some examples.

FIG. 9 illustrates a view 900 of the user interface of a chat application presented in 3D or AR space through the display of a head-worn AR device, such as smart glasses. This interface showcases two distinct message threads 902 and 904, demonstrating the system's capability to handle multiple conversations in a spatially-aware and context-sensitive manner.

The first message thread involves a chat session between the viewing user and a friend or social connection. In this example, the friend is sharing a recipe and has designated the viewing user's kitchen as the physical location to which the message thread is tied. This means that all messages associated with this thread are only visible to the message recipient (the viewing user wearing the AR device) when they are in the kitchen. Moreover, the message thread may be available for viewing when in the kitchen, even when the viewing end-user leaves and later returns to the kitchen.

The AR device employs computer vision algorithms to determine the user's location within the kitchen and strategically position the message thread. This positioning is done in a way that does not interfere with whatever work the viewing user might be doing while wearing the AR device in the kitchen. For instance, the system might anchor the chat thread to a kitchen wall or above a countertop, ensuring it's visible but not obstructing the user's view of cooking surfaces or utensils.

The system operates by continuously processing images captured via the camera integrated with the AR device. As the user moves around the kitchen, the device updates the position and orientation of the message thread in real-time, maintaining its spatial consistency and ensuring it remains easily readable without hindering the user's activities.

The second message thread 904 displayed in the AR interface is a conversation between the viewing user and an automated conversational chatbot referred to as "My AI". In this example, the viewing user is asking for additional information about food, specifically inquiring about what goes well with fresh bread. The AI conversational bot has provided a response, which is displayed within the AR environment.

This dual-thread display demonstrates the system's ability to manage multiple conversations simultaneously in AR space, each potentially tied to different contexts or locations. The AI-assisted thread might be positioned in a more general location or could be programmed to appear near relevant objects (e.g., near the bread box or pantry when discussing bread pairings).

The operation of this system in this context involves several key components:

Spatial Mapping: The AR device continuously maps the user's environment, identifying key features of the kitchen such as countertops, appliances, and walls. This spatial understanding allows for intelligent placement of virtual content.

Object Recognition: Using computer vision algorithms, the system identifies specific objects in the kitchen. This capability could be used to anchor messages near relevant items (e.g., recipe messages near the stove).

Content Analysis: The system analyzes the content of incoming messages to determine their context. In this case, it recognizes that one thread is about recipes, allowing it to make intelligent decisions about placement in the kitchen environment.

User Interaction Tracking: The system monitors the user's gaze and hand movements to ensure that message threads are easily accessible but do not interfere with the user's activities.

AI Integration: The "My AI" chatbot demonstrates the system's ability to integrate AI-powered conversational agents directly into the AR messaging experience, providing contextual information and assistance.

Multi-threading: The system manages multiple conversation threads simultaneously, potentially using different display styles or locations for each based on their content and context.

This AR messaging system creates a highly immersive and context-aware communication experience, seamlessly blending digital interactions with the physical environment. It allows users to engage in multiple conversations while performing real-world tasks, with the AR interface adapting to the user's location, activities, and the content of the messages.

Figure 10:
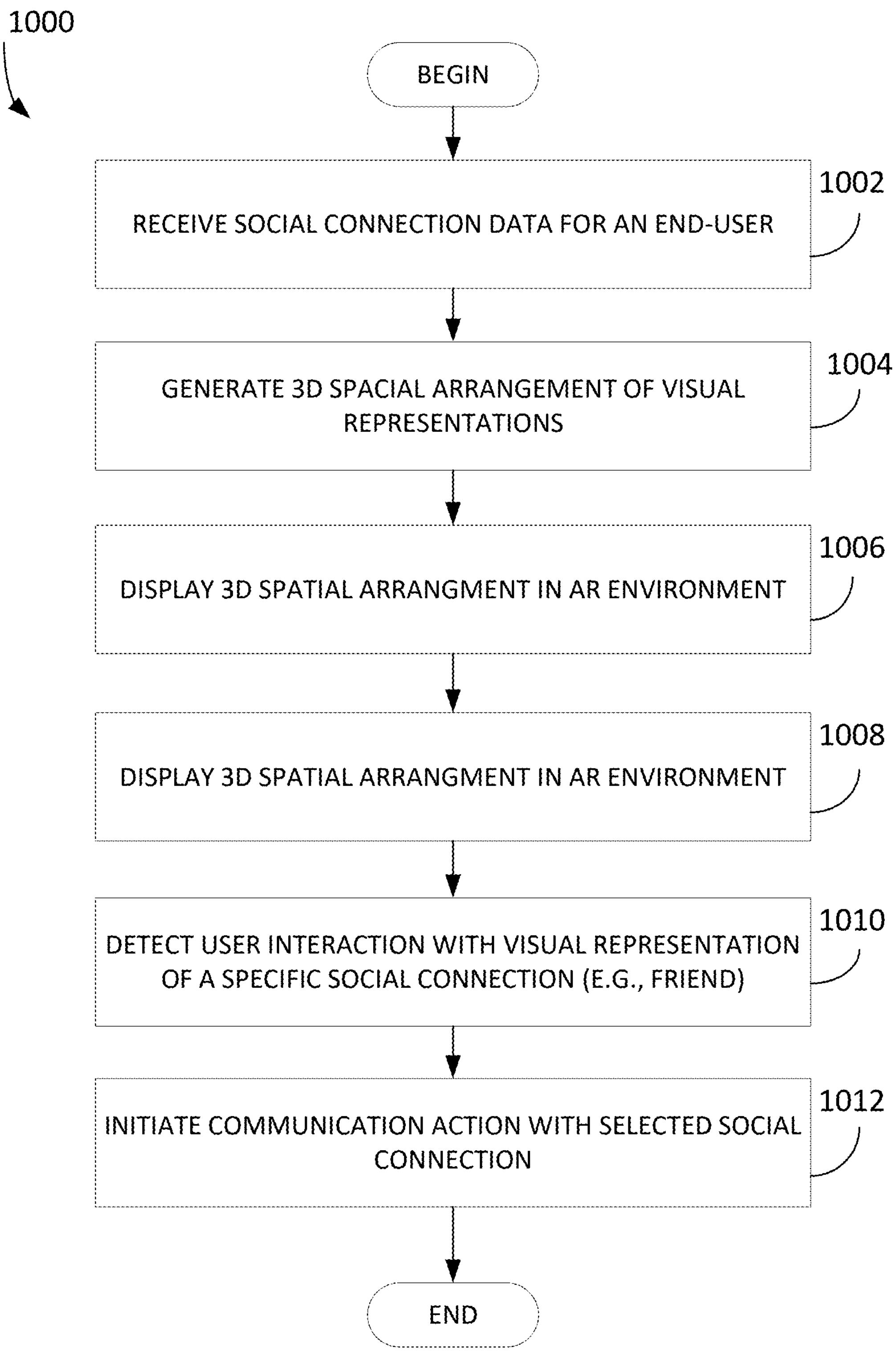
FIG. 10 is a flowchart illustrating a method for generating and displaying a spatial friend feed in an augmented reality environment, according to some examples.

FIG. 10 illustrates a flowchart depicting a method 1000 for generating and presenting a spatial friend feed in an augmented reality (AR) environment. The method 1000 begins with step 1002, which involves receiving social connection data for an end-user. In this step, the system receives comprehensive information about the viewing end-user's social connections within the application. This data includes identifiers for other end-users who have established a connection with the viewing end-user, commonly referred to as "friends" or "social connections" in the context of the application. Crucially, this social connection data also encompasses a set of relationship attributes for each friend or social connection. These attributes serve to characterize the nature and strength of the connection between the viewing end-user and each of their social connections. The relationship attributes may include various metrics such as communication frequency, which represents how often the viewing end-user interacts with each social connection through the system; a relationship closeness score, which is a numerical value indicating the overall strength of the relationship based on factors like interaction history, mutual friends, and shared interests; recency of interaction, which provides a timestamp or relative measure of how recently the viewing end-user has communicated or engaged with each social connection's content; shared experiences, which records joint activities or events attended together within the system; content similarity, measuring how closely the users' shared content or interests align; and physical proximity, which tracks how often the viewing end-user and each social connection are in the same physical locations or geographic areas. This comprehensive set of social connection data, encompassing both the identities of connected users and the associated relationship attributes, forms the foundation for generating the spatial friend feed in subsequent steps of the method.

Step 1004 involves generating a 3D spatial arrangement of visual representations, where each visual representation corresponds to a friend or social connection of the viewing end-user. This step leverages the relationship attributes received in step 1002 to determine various characteristics of the visual representations, particularly their depth within the 3D space. The system utilizes these attributes to create a meaningful and intuitive spatial arrangement that reflects the nature and strength of each social connection. A key aspect of this arrangement is the use of depth in 3D space to convey information about the relationships. For instance, friends with whom the user communicates more frequently may be positioned closer to the viewer, while those with less frequent communication may appear further away. The overall strength of the relationship, as indicated by the closeness score, can be directly mapped to the depth positioning, with closer friends appearing nearer to the user's viewpoint and those with lower scores placed at greater depths. More recent interactions could result in the visual representation being positioned closer to the foreground, with less recent interactions pushed further back in the 3D space. The system may employ a weighted algorithm that considers multiple relationship attributes to determine the final depth positioning of each visual representation, allowing for a nuanced representation of the user's social network in the 3D space. Additionally, the depth positioning can be combined with other visual characteristics to create a rich, informative spatial layout. For example, the X and Y axes could represent different attributes such as shared interests and physical proximity, while the Z-axis (depth) represents the overall relationship strength or recency of interactions. This 3D spatial arrangement creates a more intuitive and engaging way for users to visualize and interact with their social connections in an AR environment, leveraging the unique capabilities of spatial computing devices to provide a rich, context-aware social experience.

Step 1006 involves displaying the 3D spatial arrangement of visual representations of the social connections in the AR environment. In this step, the system renders the generated 3D spatial arrangement on the display of the AR device, allowing the viewing end-user to perceive and interact with their social connections in a three-dimensional space. The visual representations, which may take the form of avatars, icons, or other graphical elements, are positioned within the AR environment according to the spatial arrangement determined in step 1004. This display leverages the unique capabilities of AR technology to blend digital content with the user's physical surroundings, creating an immersive and intuitive representation of the user's social network. The depth positioning of each visual representation, along with other visual characteristics such as size, color, or shape, conveys information about the nature and strength of each social connection. This spatial presentation allows users to quickly grasp the status and importance of their various social connections at a glance, providing a more engaging and informative experience compared to traditional two-dimensional contact lists or friend feeds.

Step 1008 involves detecting user interaction with the visual representation of a specific social connection in the 3D spatial arrangement. In this step, the system continuously monitors for user input directed at the displayed visual representations. This interaction may take various forms depending on the capabilities of the AR device and the design of the user interface. For example, the user might use hand gestures to reach out and "touch" or "grab" a virtual element representing a friend in the AR space. Alternatively, the system could employ eye-tracking technology to detect when the user is looking at a specific visual representation for an extended period, interpreting this as a selection. Voice commands could also be used, allowing users to select a friend by speaking their name. In some implementations, the AR device might include a handheld controller that users can use for pointing and selection within the 3D environment. This step is crucial for enabling intuitive and natural interactions within the AR environment, allowing users to easily navigate their spatial friend feed and initiate further actions with their social connections.

Step 1010 determines the type of communication action to be initiated based on the detected user interaction from step 1008. The system interprets the specific gesture, gaze, voice command, or other input method used by the user to interact with a friend's visual representation. Different types of interactions may be mapped to different communication actions. For instance, a quick tap gesture might initiate a text chat, while a grabbing motion could start a voice call. A prolonged gaze combined with a voice command might trigger a video call or initiate a live stream. The system may also consider contextual factors, such as the time of day or the user's current activity, to suggest appropriate communication actions. This step ensures that the spatial friend feed is not just a visual representation of social connections, but also a functional interface for initiating various forms of communication, leveraging the unique interaction capabilities of AR devices.

Step 1012 involves initiating the communication action determined in step 1010 with the selected social connection. Once the system has interpreted the user's interaction and determined the desired communication action, it proceeds to execute that action. This might involve opening a chat interface within the AR environment, initiating a voice or video call, or launching a shared AR experience with the selected friend. The communication action is seamlessly integrated into the AR environment, maintaining the immersive and spatial nature of the interaction. For example, a text chat might appear as a 3D object near the friend's visual representation, while a voice call could utilize spatial audio to make it seem as if the friend's voice is coming from their position in the 3D space. This step completes the interaction loop, allowing users to move from visualizing their social connections in 3D space to actively engaging with them, all within the context of the AR environment.

Figure 11:
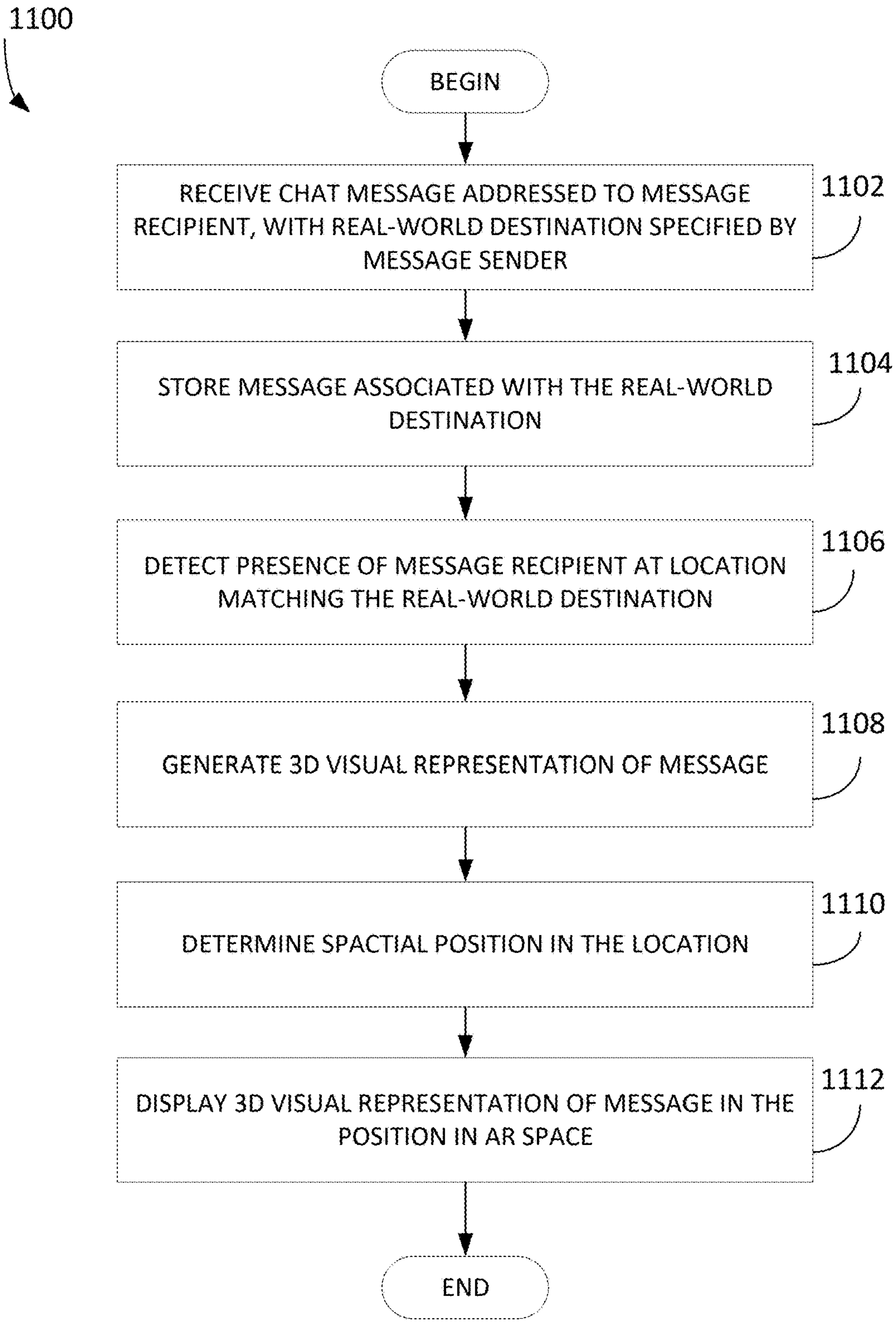
FIG. 11 is a flowchart illustrating a method for generating and displaying a chat message in an augmented reality environment based on a specified real-world destination, according to some examples.

FIG. 11 illustrates a flowchart depicting a method 1100 for sending and receiving a message in destination mode within an augmented reality (AR) environment. The method 1100 comprises several steps, each of which will be described in detail below.

Step 1102 involves receiving a chat message addressed to a message recipient, with a real-world destination specified by the message sender. In this step, the system receives a message from a sender who has chosen to use the destination mode feature. The message includes not only the content to be communicated but also a specified real-world location where the recipient should receive the message. This location could be a specific geographic coordinate, a named place (e.g., "kitchen," "coffee shop"), or even a relative location on the recipient's body (e.g., "hand," "wrist"). The sender may specify this destination using a user interface similar to that shown in FIG. 7, where various destination options are presented.

Step 1104 involves storing the message in association with the specified real-world destination. Once the system receives the message and its associated destination, it securely stores this information. The storage may occur on a server or, in some implementations, directly on the recipient's device. The message is not immediately delivered to the recipient but is instead held in storage until the conditions for delivery are met. This step is crucial for enabling the location-based delivery mechanism that is central to the destination mode feature.

Step 1106 involves detecting the presence of the message recipient at a location matching the real-world destination. This step utilizes various location-sensing technologies to determine when the recipient has entered the specified location. For outdoor locations, GPS may be the primary method used. In indoor environments, the system might employ Wi-Fi positioning, cellular network triangulation, or Bluetooth beacons for more precise localization. In AR-specific implementations, computer vision algorithms may analyze the recipient's surroundings through the AR device's cameras to identify when they have entered the specified location. This could involve recognizing specific objects or spatial arrangements that characterize the destination.

Step 1108 involves generating a three-dimensional (3D) visual representation of the message. Once the system has detected that the recipient is in the specified location, it prepares to present the message in the AR environment. This step involves creating a 3D model or visual element that represents the message. The visual representation could take various forms, such as a floating text bubble, an animated 3D object, or even an avatar of the sender. The design of this visual representation may take into account the content of the message, the relationship between the sender and recipient, or the nature of the specified location.

Step 1110 involves determining a spatial position for the 3D visual representation within the location. This step is critical for integrating the message seamlessly into the recipient's AR environment. The system analyzes the recipient's surroundings, captured through the AR device's sensors, to find an appropriate place to position the message. This could involve identifying flat surfaces, avoiding obstructions, or even anchoring the message to specific real-world objects that are relevant to its content. The positioning algorithm may also consider factors such as the recipient's current field of view, ensuring that the message is easily noticeable without being intrusive.

Step 1112, the final step, involves displaying the 3D visual representation of the message at the determined spatial position in the AR space. Here, the system renders the message's visual representation in the recipient's AR view, placing it at the position determined in the previous step. This creates the illusion that the digital message exists within the recipient's physical environment. The display may include animations or effects to draw the recipient's attention to the newly appeared message. Additionally, the system may implement interaction mechanisms, allowing the recipient to engage with the message through gestures, voice commands, or other input methods supported by their AR device.

This method for sending and receiving messages in destination mode leverages the unique capabilities of AR technology to create a more immersive and context-aware messaging experience. By tying digital communications to specific real-world locations, it bridges the gap between virtual interactions and physical spaces, potentially enhancing the relevance and impact of messages exchanged between users.

In some embodiments, a message or message thread may be processed at the messaging service on the server using a prompt generator. The prompt generator creates a prompt that includes all or portions of the message or message thread as context, which is then used as input for a generative language model, such as a Large Language Model (LLM).

Large Language Models are advanced artificial intelligence systems trained on vast amounts of text data to understand and generate human-like text. These models use deep learning techniques, typically based on transformer architectures, to process and generate natural language. LLMs are trained on diverse corpora of text, allowing them to learn patterns, relationships, and knowledge across a wide range of topics. They operate by predicting the most likely next word or sequence of words based on the input they receive, taking into account the context and patterns learned during training.

In addition to using pre-trained Large Language Models (LLMs), the system may employ fine-tuned models specifically optimized for the task of analyzing message content and determining relevant topics or object associations in AR environments. Fine-tuning involves further training of a pre-trained LLM on a specialized dataset that closely resembles the target task. For this application, the fine-tuning process could involve training the model on a dataset of messages and corresponding real-world object associations, along with examples of appropriate topic identifications and placement suggestions. This dataset would include diverse examples of message content, detected objects in AR environments, and ideal placements or associations between the two. By exposing the model to these task-specific examples, it can learn to more accurately identify relevant topics and suggest optimal message placements within AR spaces. The fine-tuned model would likely demonstrate improved performance in understanding the nuances of AR-based messaging and provide more contextually appropriate suggestions for message placement and topic identification, enhancing the overall user experience of the spatial messaging system.

The LLM used in this system may be locally hosted on the server or accessed remotely over a network, depending on the specific implementation and resource requirements. A locally hosted model offers advantages in terms of data privacy and reduced latency, while a remotely accessed model may provide access to more powerful or frequently updated models without the need for local infrastructure.

The prompt generated for the LLM may optionally include information about objects that have been detected within the real-world space of the message recipient or intended recipient. This object detection is performed using computer vision and object recognition algorithms on the AR device. By including this information in the prompt, the system provides additional context to the LLM, allowing it to consider the physical environment when analyzing the message content.

The prompt includes an instruction that directs the model to analyze the provided context (e.g., the message or message thread, and optionally the detected real-world objects) and identify one or more potential topics or subjects to which the message relates. This instruction guides the LLM's analysis, ensuring that its output is focused on determining relevant topics that can be used for further processing or message placement within the AR environment.

In some embodiments, the instruction in the prompt may be even more explicit, directing the model to determine the best object to which a message or message thread should be anchored or positioned next to. This determination is based on the correspondence between the topics identified in the message or message thread and the objects detected in the real-world scene. For example, if the message discusses cooking and a kitchen appliance has been detected in the recipient's environment, the LLM might suggest anchoring the message near that appliance.

The process works as follows: When a message is received or a message thread is updated, the system generates a prompt that includes the message content, any relevant context from the thread, and optionally, a list of objects detected in the recipient's environment. The prompt also contains the instruction for the LLM to analyze this information and identify relevant topics or suggest optimal placement. This prompt is then sent to the LLM, either on the local server or via a network request to a remote service.

The LLM processes the prompt, leveraging its vast knowledge base to understand the content and context of the message. It then generates an output that includes the identified topics or suggested object associations. This output is returned to the messaging service, which can then use this information to determine the optimal placement and presentation of the message within the recipient's AR environment.

By utilizing an LLM in this manner, the system can provide more intelligent and context-aware placement of messages in the AR space, enhancing the user experience by making digital communications more relevant and integrated with the physical world. This approach leverages the power of advanced natural language processing to create a more immersive and intuitive messaging experience in augmented reality environments.

System With Head-Wearable Apparatus

Figure 12:
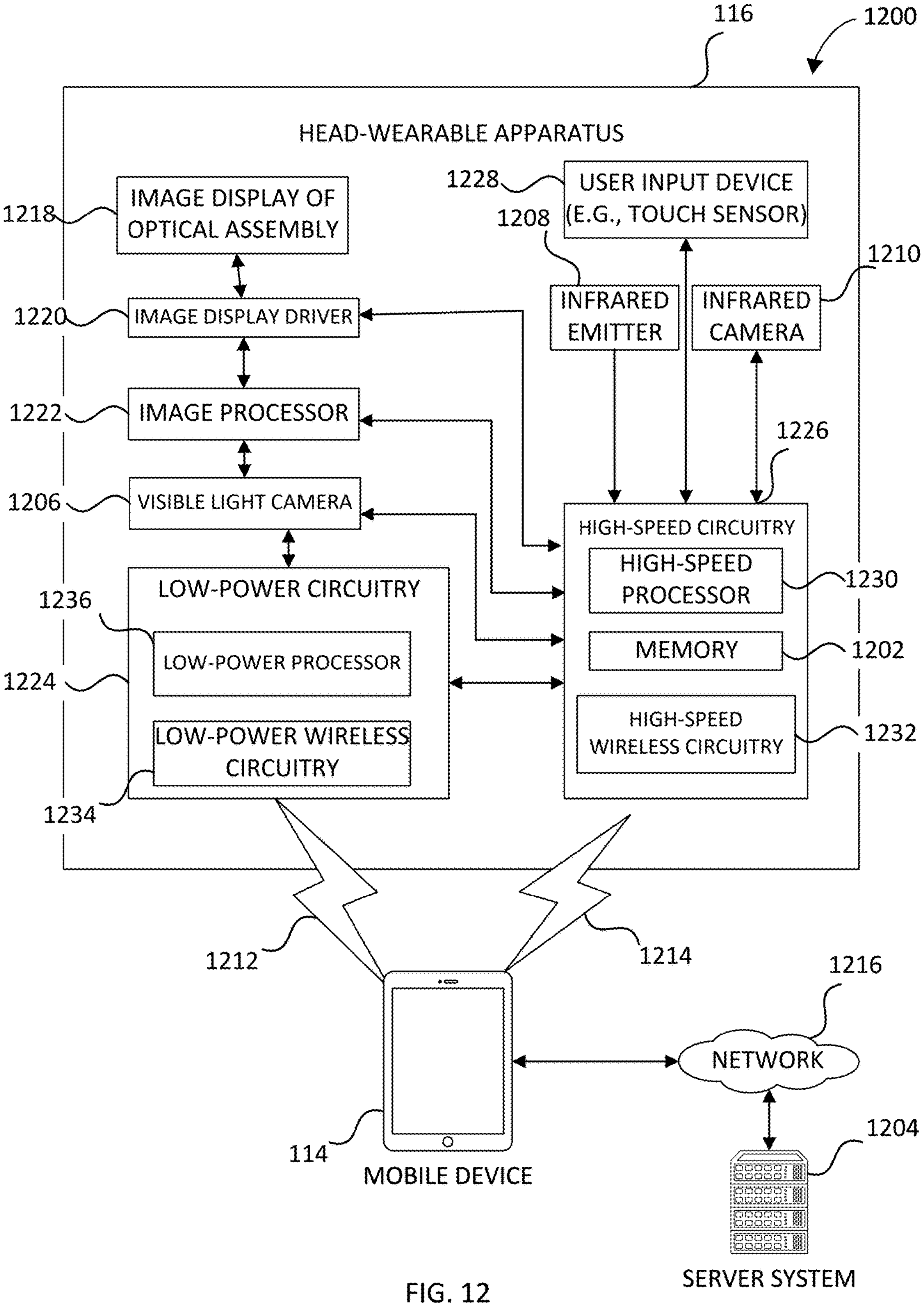
FIG. 12 illustrates a system in which the head-wearable apparatus, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the server system 110) via various networks 108.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset, or all the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WI-FI®. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (e.g., Bluetooth™, Bluetooth LE, Zigbee, ANT+) and wireless wide, local, or wide area network transceivers (e.g., cellular or WI-FI®). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
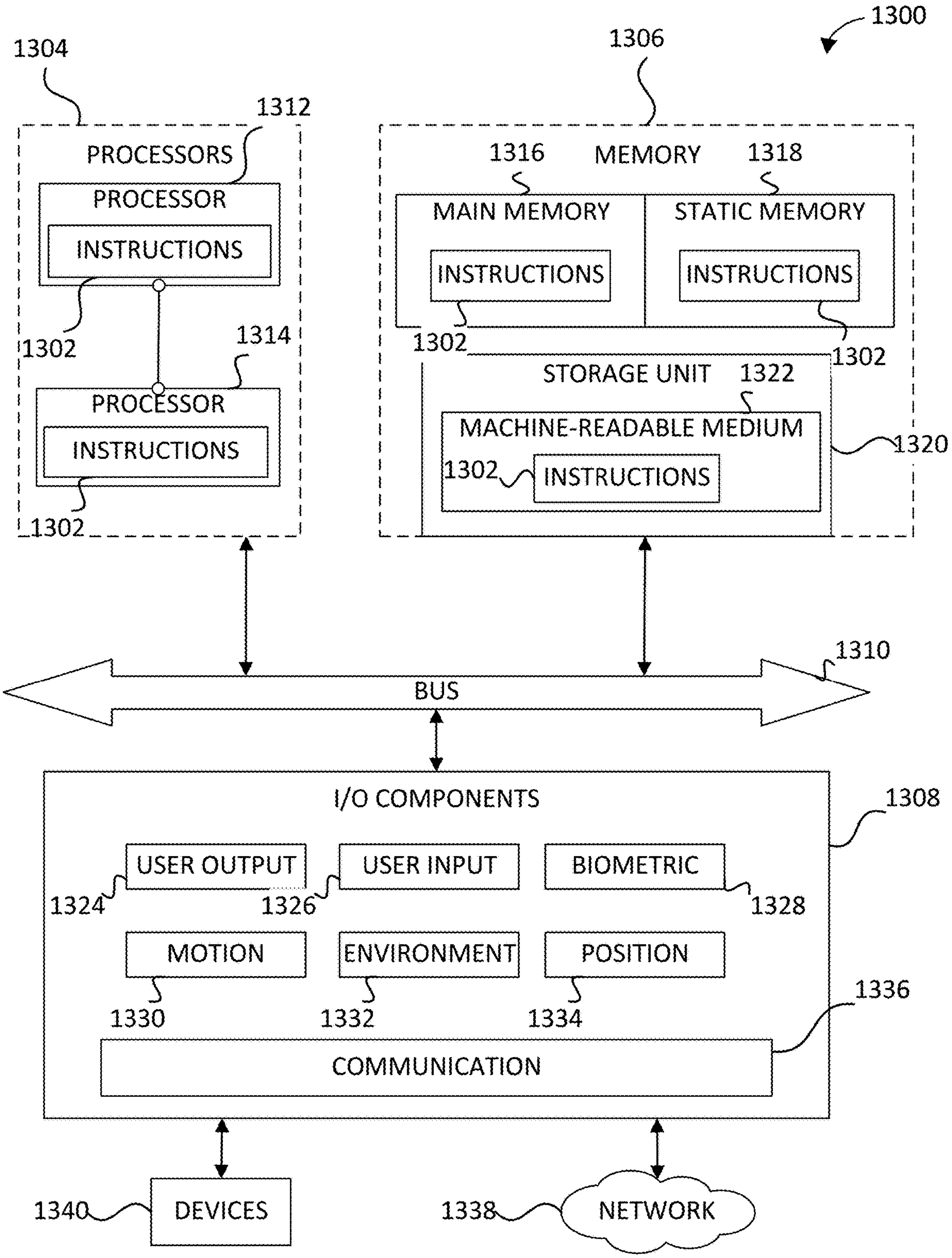
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the server system 110. In some examples, the machine 1300 may also comprise both client and server systems, with certain operations of a particular method or algorithm being performed on the server-side and with certain operations of the method or algorithm being performed on the client-side.

The machine 1300 may include processors 1304 (e.g., a processor 1312), memory 1306 (coupled to the processors 1304 via a bus 1314), and input/output I/O components 1308, which may be configured to communicate with each other via a bus 1310.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324, user input components 1326, biometric components 1328, and position components 1334. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
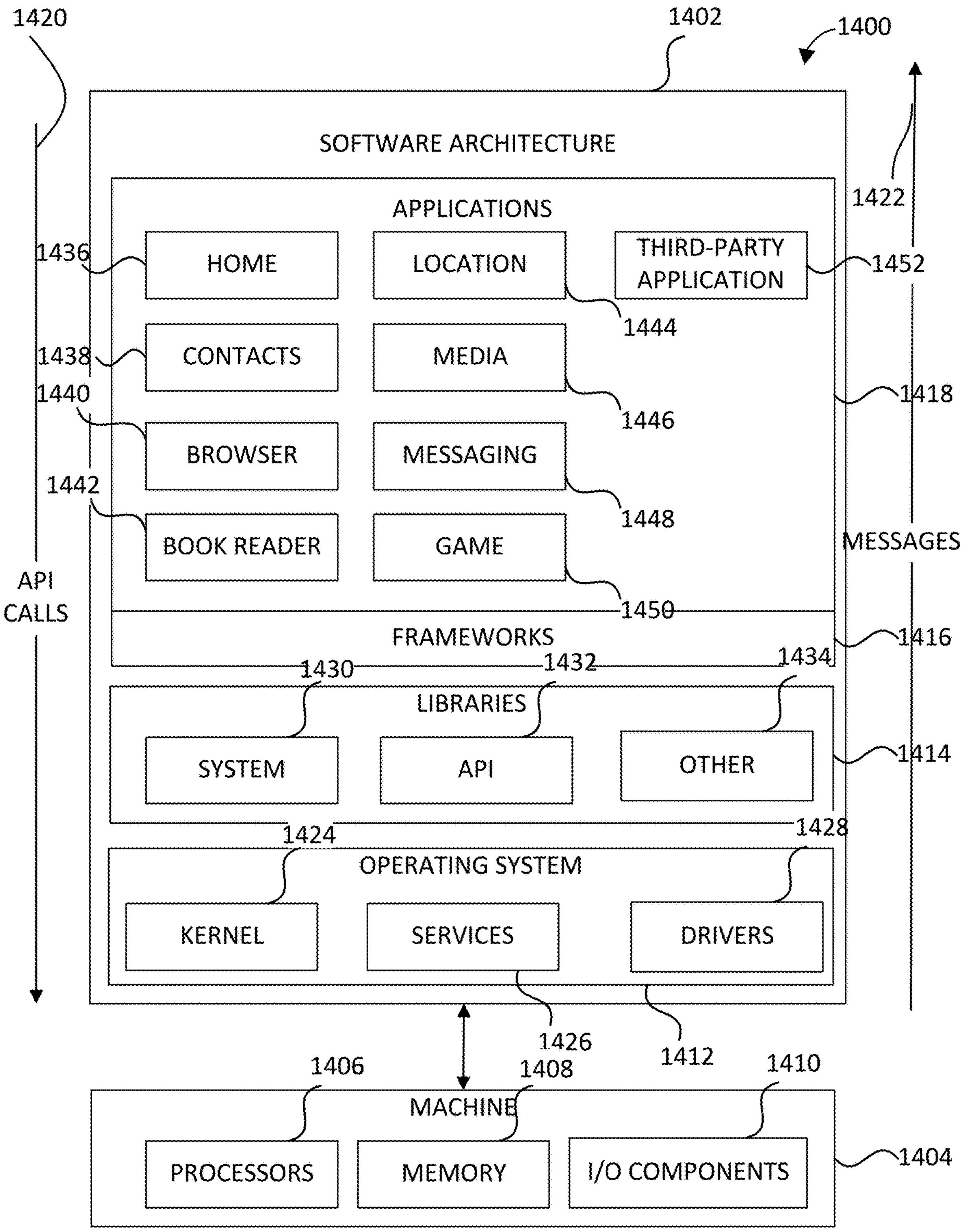
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematical functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

Example 1 is a device for displaying a spatial friend feed in an augmented reality (AR) environment, the device comprising: at least one camera; at least one display; at least one processor; and at least one memory storage device storing instruction thereon, which, when executed by the at least one processor, cause the device to perform operations comprising: receiving, by a chat application executing at an AR device, a chat message from a sender device, the chat message comprising message content and a specified real-world destination; storing the chat message in association with the specified real-world destination; detecting, by the AR device, that a user of the AR device has entered a physical location corresponding to the specified real-world destination; in response to detecting that the user has entered the physical location: generating a three-dimensional (3D) visual representation of the chat message; determining a spatial position for the 3D visual representation within the physical location based on environmental data captured by at least one sensor of the AR device; displaying, via a display of the AR device, the 3D visual representation of the chat message at the determined spatial position in the AR environment; detecting a user interaction with the displayed 3D visual representation; and initiating a communication action related to the chat message in response to the detected user interaction.

In Example 2, the subject matter of Example 1 includes, D visual representation within the physical location comprises: analyzing the message content to identify a topic or keyword; detecting one or more objects within the physical location using computer vision techniques applied to image data captured by a camera of the AR device; matching the identified topic or keyword to a detected object; and positioning the 3D visual representation proximate to the matched object in the AR environment.

In Example 3, the subject matter of Example 2 includes, wherein analyzing the message content to identify a topic or keyword comprises: generating a prompt for a generative language model, the prompt including the message content and an instruction directing the model to output a predetermined number of potential topics related to the message content; providing the generated prompt to the generative language model as input; receiving, from the generative language model, an output comprising the predetermined number of potential topics; and selecting at least one topic from the received output for use in matching to a detected object.

In Example 4, the subject matter of Examples 1-3 includes, wherein detecting that the user has entered the physical location corresponding to the specified real-world destination comprises at least one of: determining a current geographic position of the AR device using a GPS component of the AR device; or detecting a connection to a specific network; identifying the specific network; and determining that the specific network is associated with the specified real-world destination based on a mapping of networks to known locations.

In Example 5, the subject matter of Examples 1-4 includes, wherein detecting that the user has entered the physical location corresponding to the specified real-world destination comprises: capturing, by a camera of the AR device, one or more images of the physical location; analyzing the captured images using computer vision or object detection algorithms to identify objects within the physical location; comparing the identified objects to a database that maps objects to known locations; and determining that the identified objects match objects associated with the specified real-world destination in the database.

In Example 6, the subject matter of Examples 1-5 includes, wherein the operations further comprise: determining a timestamp associated with the chat message; calculating a depth value based on the timestamp, wherein more recent messages are assigned smaller depth values and older messages are assigned larger depth values; positioning the 3D visual representation of the chat message within the AR environment at a depth corresponding to the calculated depth value, such that more recent messages appear closer to the user and older messages appear farther away.

In Example 7, the subject matter of Examples 1-6 includes, wherein the operations further comprise: analyzing the environmental data to determine a current context or activity of the user; identifying one or more chat threads related to the determined context or activity; repositioning the 3D visual representations of the identified chat threads to be more prominently displayed within the AR environment; and repositioning 3D visual representations of chat threads unrelated to the determined context or activity to be less prominently displayed within the AR environment.

In Example 8, the subject matter of Examples 1-7 includes, wherein the operations further comprise: determining an age of the chat message based on its timestamp; adjusting a visual property of the 3D visual representation based on the determined age, wherein the visual property comprises at least one of opacity, color saturation, or size; and updating the display of the 3D visual representation to reflect the adjusted visual property, such that older messages are visually distinguished from newer messages in the AR environment.

In Example 9, the subject matter of Examples 1-8 includes, wherein initiating the communication action comprises: detecting a gesture or voice command from the user interacting with the 3D visual representation; interpreting the detected gesture or voice command to determine a corresponding communication action; executing the determined communication action, wherein the communication action includes at least one of: replying to the chat message, forwarding the chat message, deleting the chat message, editing the chat message, or changing the spatial position of the 3D visual representation within the AR environment; and updating the display to reflect the executed communication action.

Example 10 is a method for managing a chat thread in an augmented reality (AR) environment, the method comprising: receiving, by a chat application executing at an AR device, a chat message from a sender device, the chat message comprising message content and a specified real-world destination; storing the chat message in association with the specified real-world destination; detecting, by the AR device, that a user of the AR device has entered a physical location corresponding to the specified real-world destination; in response to detecting that the user has entered the physical location: generating a three-dimensional (3D) visual representation of the chat message; determining a spatial position for the 3D visual representation within the physical location based on environmental data captured by at least one sensor of the AR device; displaying, via a display of the AR device, the 3D visual representation of the chat message at the determined spatial position in the AR environment; detecting a user interaction with the displayed 3D visual representation; and initiating a communication action related to the chat message in response to the detected user interaction.

In Example 11, the subject matter of Example 10 includes, D visual representation within the physical location comprises: analyzing the message content to identify a topic or keyword; detecting one or more objects within the physical location using computer vision techniques applied to image data captured by a camera of the AR device; matching the identified topic or keyword to a detected object; and positioning the 3D visual representation proximate to the matched object in the AR environment.

In Example 12, the subject matter of Example 11 includes, wherein analyzing the message content to identify a topic or keyword comprises: generating a prompt for a generative language model, the prompt including the message content and an instruction directing the model to output a predetermined number of potential topics related to the message content; providing the generated prompt to the generative language model as input; receiving, from the generative language model, an output comprising the predetermined number of potential topics; and selecting at least one topic from the received output for use in matching to a detected object.

In Example 13, the subject matter of Examples 10-12 includes, wherein detecting that the user has entered the physical location corresponding to the specified real-world destination comprises at least one of: determining a current geographic position of the AR device using a GPS component of the AR device; or detecting a connection to a specific network; identifying the specific network; and determining that the specific network is associated with the specified real-world destination based on a mapping of networks to known locations.

In Example 14, the subject matter of Examples 10-13 includes, wherein detecting that the user has entered the physical location corresponding to the specified real-world destination comprises: capturing, by a camera of the AR device, one or more images of the physical location; analyzing the captured images using computer vision or object detection algorithms to identify objects within the physical location; comparing the identified objects to a database that maps objects to known locations; and determining that the identified objects match objects associated with the specified real-world destination in the database.

In Example 15, the subject matter of Examples 10-14 includes, determining a timestamp associated with the chat message; calculating a depth value based on the timestamp, wherein more recent messages are assigned smaller depth values and older messages are assigned larger depth values; positioning the 3D visual representation of the chat message within the AR environment at a depth corresponding to the calculated depth value, such that more recent messages appear closer to the user and older messages appear farther away.

In Example 16, the subject matter of Examples 10-15 includes, wherein the method further comprises: analyzing the environmental data to determine a current context or activity of the user; identifying one or more chat threads related to the determined context or activity; repositioning the 3D visual representations of the identified chat threads to be more prominently displayed within the AR environment; and repositioning 3D visual representations of chat threads unrelated to the determined context or activity to be less prominently displayed within the AR environment.

In Example 17, the subject matter of Examples 10-16 includes, wherein the method further comprises: determining an age of the chat message based on its timestamp; adjusting a visual property of the 3D visual representation based on the determined age, wherein the visual property comprises at least one of opacity, color saturation, or size; and updating the display of the 3D visual representation to reflect the adjusted visual property, such that older messages are visually distinguished from newer messages in the AR environment.

In Example 18, the subject matter of Examples 10-17 includes, wherein initiating the communication action comprises: detecting a gesture or voice command from the user interacting with the 3D visual representation; interpreting the detected gesture or voice command to determine a corresponding communication action; executing the determined communication action, wherein the communication action includes at least one of: replying to the chat message, forwarding the chat message, deleting the chat message, editing the chat message, or changing the spatial position of the 3D visual representation within the AR environment; and updating the display to reflect the executed communication action.

Example 19 is a device for displaying a spatial friend feed in an augmented reality (AR) environment, the device comprising: means for receiving, by a chat application executing at an AR device, a chat message from a sender device, the chat message comprising message content and a specified real-world destination; means for storing the chat message in association with the specified real-world destination; means for detecting, by the AR device, that a user of the AR device has entered a physical location corresponding to the specified real-world destination; in response to detecting that the user has entered the physical location: means for generating a three-dimensional (3D) visual representation of the chat message; means for determining a spatial position for the 3D visual representation within the physical location based on environmental data captured by at least one sensor of the AR device; means for displaying, via a display of the AR device, the 3D visual representation of the chat message at the determined spatial position in the AR environment; means for detecting a user interaction with the displayed 3D visual representation; and means for initiating a communication action related to the chat message in response to the detected user interaction.

In Example 20, the subject matter of Example 19 includes, D visual representation within the physical location comprises: means for analyzing the message content to identify a topic or keyword; means for detecting one or more objects within the physical location using computer vision techniques applied to image data captured by a camera of the AR device; means matching the identified topic or keyword to a detected object; and means for positioning the 3D visual representation proximate to the matched object in the AR environment.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Terms

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, network attached storage (NAS), storage area networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VoIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" may include, for example, a device accessed, controlled or owned by a user and with which the user interacts perform an action, engagement or interaction on the user device, including an interaction with other users or computer systems.

What is claimed is:

1. A device for displaying a spatial friend feed in an augmented reality (AR) environment, the device comprising:

at least one camera;

at least one display;

at least one processor; and at least one memory storage device storing instruction thereon, which, when executed by the at least one processor, cause the device to perform operations comprising:

receiving, by a chat application executing at an AR device, a chat message from a sender device, the chat message comprising message content and a specified real-world destination;

storing the chat message in association with the specified real-world destination;

detecting, by the AR device, that a user of the AR device has entered a physical location corresponding to the specified real-world destination;

in response to detecting that the user has entered the physical location:

generating a three-dimensional (3D) visual representation of the chat message;

determining a spatial position for the 3D visual representation within the physical location based on environmental data captured by at least one sensor of the AR device;

displaying, via a display of the AR device, the 3D visual representation of the chat message at the determined spatial position in the AR environment;

determining a timestamp associated with the chat message;

calculating a depth value based on the timestamp, wherein more recent messages are assigned smaller depth values and older messages are assigned larger depth values;

positioning the 3D visual representation of the chat message within the AR environment at a depth corresponding to the calculated depth value, such that more recent messages appear closer to the user and older messages appear farther away;

detecting a user interaction with the displayed 3D visual representation; and initiating a communication action related to the chat message in response to the detected user interaction.

2. The device of claim 1, wherein determining the spatial position for the 3D visual representation within the physical location comprises:

analyzing the message content to identify a topic or keyword;

detecting one or more objects within the physical location using computer vision techniques applied to image data captured by a camera of the AR device;

matching the identified topic or keyword to a detected object; and positioning the 3D visual representation proximate to the matched object in the AR environment.

3. The device of claim 2, wherein analyzing the message content to identify a topic or keyword comprises:

generating a prompt for a generative language model, the prompt including the message content and an instruction directing the model to output a predetermined number of potential topics related to the message content;

providing the generated prompt to the generative language model as input;

receiving, from the generative language model, an output comprising the predetermined number of potential topics; and selecting at least one topic from the received output for use in matching to a detected object.

4. The device of claim 1, wherein detecting that the user has entered the physical location corresponding to the specified real-world destination comprises at least one of:

determining a current geographic position of the AR device using a GPS component of the AR device; or detecting a connection to a specific network;

identifying the specific network; and determining that the specific network is associated with the specified real-world destination based on a mapping of networks to known locations.

5. The device of claim 1, wherein detecting that the user has entered the physical location corresponding to the specified real-world destination comprises:

capturing, by a camera of the AR device, one or more images of the physical location;

analyzing the captured images using computer vision or object detection algorithms to identify objects within the physical location;

comparing the identified objects to a database that maps objects to known locations; and determining that the identified objects match objects associated with the specified real-world destination in the database.

6. The device of claim 1, wherein the operations further comprise:

analyzing the environmental data to determine a current context or activity of the user;

identifying one or more chat threads related to the determined context or activity;

repositioning the 3D visual representations of the identified chat threads to be more prominently displayed within the AR environment; and repositioning 3D visual representations of chat threads unrelated to the determined context or activity to be less prominently displayed within the AR environment.

7. The device of claim 1, wherein the operations further comprise:

determining an age of the chat message based on its timestamp;

adjusting a visual property of the 3D visual representation based on the determined age, wherein the visual property comprises at least one of opacity, color saturation, or size; and updating the display of the 3D visual representation to reflect the adjusted visual property, such that older messages are visually distinguished from newer messages in the AR environment.

8. The device of claim 1, wherein initiating the communication action comprises:

detecting a gesture or voice command from the user interacting with the 3D visual representation;

interpreting the detected gesture or voice command to determine a corresponding communication action;

executing the determined communication action, wherein the communication action includes at least one of:

replying to the chat message, forwarding the chat message, deleting the chat message,
editing the chat message, or
changing the spatial position of the 3D visual representation within the AR environment; and
updating the display to reflect the executed communication action.

9. A method for managing a chat thread in an augmented reality (AR) environment, the method comprising:
receiving, by a chat application executing at an AR device, a chat message from a sender device, the chat message comprising message content and a specified real-world destination;
storing the chat message in association with the specified real-world destination;
detecting, by the AR device, that a user of the AR device has entered a physical location corresponding to the specified real-world destination;
in response to detecting that the user has entered the physical location:
generating a three-dimensional (3D) visual representation of the chat message;
determining a spatial position for the 3D visual representation within the physical location based on environmental data captured by at least one sensor of the AR device;
displaying, via a display of the AR device, the 3D visual representation of the chat message at the determined spatial position in the AR environment;
determining a timestamp associated with the chat message;
calculating a depth value based on the timestamp, wherein more recent messages are assigned smaller depth values and older messages are assigned larger depth values;
positioning the 3D visual representation of the chat message within the AR environment at a depth corresponding to the calculated depth value, such that more recent messages appear closer to the user and older messages appear farther away;
detecting a user interaction with the displayed 3D visual representation; and
initiating a communication action related to the chat message in response to the detected user interaction.

10. The method of claim 9, wherein determining the spatial position for the 3D visual representation within the physical location comprises:
analyzing the message content to identify a topic or keyword;
detecting one or more objects within the physical location using computer vision techniques applied to image data captured by a camera of the AR device;
matching the identified topic or keyword to a detected object; and
positioning the 3D visual representation proximate to the matched object in the AR environment.

11. The method of claim 10, wherein analyzing the message content to identify a topic or keyword comprises:
generating a prompt for a generative language model, the prompt including the message content and an instruction directing the model to output a predetermined number of potential topics related to the message content;
providing the generated prompt to the generative language model as input;
receiving, from the generative language model, an output comprising the predetermined number of potential topics; and
selecting at least one topic from the received output for use in matching to a detected object.

12. The method of claim 9, wherein detecting that the user has entered the physical location corresponding to the specified real-world destination comprises at least one of:
determining a current geographic position of the AR device using a GPS component of the AR device; or
detecting a connection to a specific network;
identifying the specific network; and
determining that the specific network is associated with the specified real-world destination based on a mapping of networks to known locations.

13. The method of claim 9, wherein detecting that the user has entered the physical location corresponding to the specified real-world destination comprises:
capturing, by a camera of the AR device, one or more images of the physical location;
analyzing the captured images using computer vision or object detection algorithms to identify objects within the physical location;
comparing the identified objects to a database that maps objects to known locations; and
determining that the identified objects match objects associated with the specified real-world destination in the database.

14. The method of claim 9, wherein the method further comprises:
analyzing the environmental data to determine a current context or activity of the user;
identifying one or more chat threads related to the determined context or activity;
repositioning the 3D visual representations of the identified chat threads to be more prominently displayed within the AR environment; and
repositioning 3D visual representations of chat threads unrelated to the determined context or activity to be less prominently displayed within the AR environment.

15. The method of claim 9, wherein the method further comprises:
determining an age of the chat message based on its timestamp;
adjusting a visual property of the 3D visual representation based on the determined age, wherein the visual property comprises at least one of opacity, color saturation, or size; and
updating the display of the 3D visual representation to reflect the adjusted visual property, such that older messages are visually distinguished from newer messages in the AR environment.

16. The method of claim 9, wherein initiating the communication action comprises:
detecting a gesture or voice command from the user interacting with the 3D visual representation;
interpreting the detected gesture or voice command to determine a corresponding communication action;
executing the determined communication action, wherein the communication action includes at least one of:
replying to the chat message,
forwarding the chat message,
deleting the chat message,
editing the chat message, or
changing the spatial position of the 3D visual representation within the AR environment; and
updating the display to reflect the executed communication action.

17. A device for displaying a spatial friend feed in an augmented reality (AR) environment, the device comprising:

means for receiving, by a chat application executing at an AR device, a chat message from a sender device, the chat message comprising message content and a specified real-world destination;

means for storing the chat message in association with the specified real-world destination;

means for detecting, by the AR device, that a user of the AR device has entered a physical location corresponding to the specified real-world destination;

in response to detecting that the user has entered the physical location:

means for generating a three-dimensional (3D) visual representation of the chat message;

means for determining a spatial position for the 3D visual representation within the physical location based on environmental data captured by at least one sensor of the AR device;

means for displaying, via a display of the AR device, the 3D visual representation of the chat message at the determined spatial position in the AR environment;

means for determining a timestamp associated with the chat message;

means for calculating a depth value based on the timestamp, wherein more recent messages are assigned smaller depth values and older messages are assigned larger depth values;

means for positioning the 3D visual representation of the chat message within the AR environment at a depth corresponding to the calculated depth value, such that more recent messages appear closer to the user and older messages appear farther away;

means for detecting a user interaction with the displayed 3D visual representation; and means for initiating a communication action related to the chat message in response to the detected user interaction.

18. The device of claim 17, wherein said means for determining the spatial position for the 3D visual representation within the physical location comprises:

means for analyzing the message content to identify a topic or keyword;

means for detecting one or more objects within the physical location using computer vision techniques applied to image data captured by a camera of the AR device;

means matching the identified topic or keyword to a detected object; and means for positioning the 3D visual representation proximate to the matched object in the AR environment.

* * * * *